(12) United States Patent
Reichter et al.

(10) Patent No.: US 12,138,574 B2
(45) Date of Patent: *Nov. 12, 2024

(54) Air Filter Arrangement; Assembly; and, Methods

(71) Applicant: Donaldson Company, Inc., Bloomington, MN (US)

(72) Inventors: Gregory Reichter, Bloomington, MN (US); Wayne R. W. Bishop, St. Louis Park, MN (US); Benny Nelson, Bloomington, MN (US); Darrel Wegner, Burnsville, MN (US); Bruce Crenshaw, Frankfurt, IN (US); Vladimir Kladnitsky, Eagan, MN (US); Donald Mork, Lime Springs, MN (US); Kevin Schrage, Spring Valley, MN (US); Richard Osendorf, West St. Paul, MN (US); Bradley Kuempel, Eden Prairie, MN (US); Thomas Lundgren, Bloomington, MN (US); Jordan Flagstad, East Bethel, MN (US); Thomas G. Miller, Eagan, MN (US)

(73) Assignee: Donaldson Company, Inc., Bloomington, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/488,129

(22) Filed: Oct. 17, 2023

(65) Prior Publication Data

US 2024/0149203 A1    May 9, 2024

Related U.S. Application Data

(63) Continuation of application No. 17/101,996, filed on Nov. 23, 2020, now Pat. No. 11,826,689, which is a
(Continued)

(51) Int. Cl.
*B01D 46/52* (2006.01)
*B01D 46/00* (2022.01)

(52) U.S. Cl.
CPC ....... *B01D 46/526* (2013.01); *B01D 46/0005* (2013.01); *B01D 2271/022* (2013.01)

(58) Field of Classification Search
CPC ................ B01D 46/525; B01D 46/526; B01D 2271/022; B01D 46/0005
See application file for complete search history.

(56) References Cited

U.S. PATENT DOCUMENTS

| 2,093,877 A | 9/1937 | Pentz |
| 2,270,969 A | 1/1942 | Robinson |

(Continued)

FOREIGN PATENT DOCUMENTS

| CN | 2296402 Y | 11/1998 |
| DE | 88 08 632 | 9/1988 |

(Continued)

OTHER PUBLICATIONS

U.S. Appl. No. 60/579,754.
(Continued)

*Primary Examiner* — Robert Clemente
(74) *Attorney, Agent, or Firm* — Merchant & Gould P.C.

(57) ABSTRACT

An air cleaner arrangement is shown. The air cleaner arrangement includes a serviceable filter cartridge. A preferred filter cartridge positionable within an air cleaner arrangement, is depicted.

34 Claims, 20 Drawing Sheets

Related U.S. Application Data continuation of application No. 16/119,121, filed on Aug. 31, 2018, now Pat. No. 10,864,475, which is a continuation of application No. 14/935,860, filed on Nov. 9, 2015, now Pat. No. 10,065,145, which is a continuation of application No. 14/165,042, filed on Jan. 27, 2014, now Pat. No. 9,180,399, which is a continuation of application No. 13/952,987, filed on Jul. 29, 2013, now Pat. No. 8,636,820, which is a continuation of application No. 11/795,178, filed as application No. PCT/US2006/001021 on Jan. 12, 2006, now Pat. No. 8,496,723.

(60) Provisional application No. 60/644,094, filed on Jan. 13, 2005.

(56) References Cited

U.S. PATENT DOCUMENTS

| | | |
|---|---|---|
| 2,306,325 A | 12/1942 | Allam |
| 2,915,325 A | 12/1959 | Buker |
| 2,955,028 A | 10/1960 | Bevans |
| 3,025,963 A | 3/1962 | Bauer |
| 3,224,592 A | 12/1965 | Burns et al. |
| 3,293,833 A | 12/1966 | Barany |
| 3,410,062 A | 11/1968 | Hart |
| 3,494,113 A | 2/1970 | Kinney |
| 3,598,738 A | 8/1971 | Biswell et al. |
| 3,645,402 A | 2/1972 | Alexander et al. |
| 3,687,849 A | 8/1972 | Abbott |
| 3,749,247 A | 7/1973 | Rohde |
| 3,921,432 A | 11/1975 | Rivers |
| 4,014,794 A | 3/1977 | Lewis |
| 4,061,572 A | 12/1977 | Cohen et al. |
| 4,066,559 A | 1/1978 | Rohde |
| 4,075,097 A | 2/1978 | Paul |
| 4,075,098 A | 2/1978 | Paul et al. |
| 4,080,185 A | 3/1978 | Richter et al. |
| 4,144,166 A | 3/1979 | Dejovine |
| 4,144,169 A | 3/1979 | Grueschow |
| 4,324,213 A | 4/1982 | Kasting et al. |
| 4,364,751 A | 12/1982 | Copley |
| 4,402,912 A | 9/1983 | Krueger et al. |
| 4,410,427 A | 10/1983 | Wydeven |
| 4,452,616 A | 6/1984 | Gillingham et al. |
| 4,589,983 A | 5/1986 | Wydevan |
| 4,600,420 A | 7/1986 | Wydeven et al. |
| 4,738,776 A | 4/1988 | Brown |
| 4,755,289 A | 7/1988 | Villani |
| 4,782,891 A | 11/1988 | Cheadle et al. |
| 4,826,517 A | 5/1989 | Norman |
| 4,861,359 A | 8/1989 | Tettman |
| 4,925,561 A | 5/1990 | Ishii et al. |
| 4,979,969 A | 12/1990 | Sturmon |
| 5,024,268 A | 6/1991 | Cheadle et al. |
| 5,050,549 A | 9/1991 | Herding |
| 5,064,799 A | 11/1991 | Cheadle et al. |
| 5,094,745 A | 3/1992 | Monte et al. |
| 5,120,334 A | 6/1992 | Cooper |
| 5,222,488 A | 2/1993 | Forsgren et al. |
| 5,213,596 A | 5/1993 | Kume et al. |
| 5,223,011 A | 6/1993 | Hanni |
| 5,225,081 A | 7/1993 | Brownawell et al. |
| 5,258,118 A | 11/1993 | Reynolds |
| 5,342,511 A | 8/1994 | Brown |
| 5,382,355 A | 1/1995 | Arlozynski |
| 5,391,212 A | 2/1995 | Ernst et al. |
| 5,435,346 A | 7/1995 | Tregidgo et al. |
| 5,459,074 A | 10/1995 | Muoni |
| 5,472,379 A | 12/1995 | Andress et al. |
| 5,472,463 A | 12/1995 | Herman et al. |
| 5,494,497 A | 2/1996 | Lee |
| 5,498,332 A | 3/1996 | Handtmann |
| 5,512,074 A | 4/1996 | Hanni et al. |
| 5,531,848 A | 7/1996 | Brinda |
| 5,541,330 A | 7/1996 | Wear et al. |
| 5,556,542 A | 9/1996 | Berman et al. |
| 5,558,689 A | 9/1996 | Yanagihara et al. |
| 5,562,825 A | 10/1996 | Yamada et al. |
| 5,575,826 A | 11/1996 | Gillingham et al. |
| 5,591,330 A | 1/1997 | Lefebvre |
| 5,605,554 A | 2/1997 | Kennedy |
| 5,643,541 A | 7/1997 | Peddicord et al. |
| 5,662,799 A | 9/1997 | Hudgens et al. |
| 5,718,258 A | 2/1998 | Lefebvre et al. |
| 5,759,217 A | 2/1998 | Joy et al. |
| 5,738,785 A | 4/1998 | Brown et al. |
| 5,753,116 A | 5/1998 | Baumann et al. |
| 5,772,873 A | 6/1998 | Hudgens et al. |
| 5,772,883 A | 6/1998 | Rothman et al. |
| 5,795,361 A | 8/1998 | Lanier, Jr. et al. |
| 5,803,024 A | 9/1998 | Brown |
| 5,814,117 A | 9/1998 | Mochida |
| 5,820,646 A | 10/1998 | Gillingham et al. |
| 5,853,439 A | 12/1998 | Gieseke et al. |
| 5,891,402 A | 4/1999 | Sassa et al. |
| 5,902,364 A | 5/1999 | Tokar et al. |
| 5,948,248 A | 9/1999 | Brown |
| 6,000,685 A | 12/1999 | Groten et al. |
| 6,045,692 A | 4/2000 | Bilski et al. |
| D425,189 S | 5/2000 | Gillingham et al. |
| 6,086,763 A | 7/2000 | Baumaun |
| 6,096,208 A | 8/2000 | Connelly et al. |
| 6,098,575 A | 8/2000 | Mulshine et al. |
| 6,129,852 A | 10/2000 | Elliot et al. |
| 6,149,700 A | 11/2000 | Morgan et al. |
| 6,165,519 A | 12/2000 | Lehrer et al. |
| 6,171,355 B1 | 1/2001 | Gieseke et al. |
| D437,402 S | 2/2001 | Gieseke et al. |
| 6,190,432 B1 | 2/2001 | Gieseke et al. |
| 6,196,019 B1 | 3/2001 | Higo et al. |
| 6,231,630 B1 | 5/2001 | Ernst et al. |
| 6,235,194 B1 | 5/2001 | Jousset |
| 6,235,195 B1 | 5/2001 | Tokar |
| 6,238,554 B1 | 5/2001 | Martin, Jr. et al. |
| 6,238,561 B1 | 5/2001 | Liu et al. |
| D444,219 S | 6/2001 | Gieseke et al. |
| 6,261,334 B1 | 7/2001 | Morgan et al. |
| 6,264,833 B1 | 7/2001 | Reamsnyder et al. |
| 6,273,938 B1 | 8/2001 | Fanselow et al. |
| RE37,369 E | 9/2001 | Hudgens et al. |
| 6,306,193 B1 | 10/2001 | Morgan et al. |
| D450,828 S | 11/2001 | Tokar |
| 6,348,084 B1 | 2/2002 | Gieseke et al. |
| 6,348,085 B1 | 2/2002 | Tokar et al. |
| 6,350,291 B1 | 2/2002 | Gieske et al. |
| D455,826 S | 4/2002 | Gillingham et al. |
| 6,379,564 B1 | 4/2002 | Rohrbach et al. |
| 6,391,076 B1 | 5/2002 | Jaroszczyk et al. |
| 6,398,832 B2 | 6/2002 | Morgan et al. |
| 6,416,561 B1 | 7/2002 | Kallsen et al. |
| 6,375,700 B1 | 8/2002 | Jaroszczyk et al. |
| 6,475,379 B2 | 11/2002 | Jousset et al. |
| 6,478,958 B1 | 11/2002 | Beard et al. |
| 6,482,247 B2 | 11/2002 | Jaroszczyk et al. |
| 6,511,599 B2 | 1/2003 | Jaroszczyk et al. |
| 6,517,598 B2 | 2/2003 | Anderson et al. |
| 6,537,453 B2 | 3/2003 | Beard et al. |
| D473,637 S | 4/2003 | Golden |
| 6,544,310 B2 | 4/2003 | Badeau et al. |
| 6,547,857 B2 | 4/2003 | Gieseke et al. |
| 6,554,139 B1 | 4/2003 | Maxwell et al. |
| 6,596,165 B2 | 7/2003 | Koivula |
| 6,610,126 B2 | 8/2003 | Xu et al. |
| 6,623,636 B2 | 9/2003 | Rohrbach et al. |
| 6,641,637 B2 | 11/2003 | Kallsen et al. |
| 6,673,136 B2 | 1/2004 | Gillingham et al. |
| 6,676,721 B1 | 1/2004 | Gillingham et al. |
| 6,709,588 B2 | 3/2004 | Pavlin et al. |
| 6,743,317 B2 | 6/2004 | Wydeven |
| 6,746,518 B2 | 6/2004 | Gieseke et al. |
| 6,787,033 B2 | 9/2004 | Beard et al. |
| 6,827,750 B2 | 12/2004 | Drozd et al. |
| 6,835,304 B2 | 12/2004 | Jousset et al. |

(56) References Cited

U.S. PATENT DOCUMENTS

| | | |
|---|---|---|
| 6,843,916 B2 | 1/2005 | Burington et al. |
| 6,860,241 B2 | 3/2005 | Martin et al. |
| 6,893,571 B2 | 5/2005 | Harenbrock et al. |
| 6,902,598 B2 | 6/2005 | Gunderson et al. |
| 6,919,023 B2 | 7/2005 | Merritt et al. |
| 6,953,124 B2 | 10/2005 | Winter et al. |
| 6,966,940 B2 | 11/2005 | Krisko et al. |
| 6,969,461 B2 | 11/2005 | Beard et al. |
| 6,984,319 B2 | 1/2006 | Merritt et al. |
| 7,001,450 B2 | 2/2006 | Gieseke et al. |
| 7,018,531 B2 | 3/2006 | Eilers et al. |
| 7,090,711 B2 | 8/2006 | Gillingham et al. |
| 7,153,422 B2 | 12/2006 | Herman et al. |
| 7,156,991 B2 | 1/2007 | Herman et al. |
| 7,160,451 B2 | 1/2007 | Hacker et al. |
| 7,182,863 B2 | 2/2007 | Eilers et al. |
| 7,182,864 B2 | 2/2007 | Brown et al. |
| 7,211,124 B2 | 5/2007 | Gieseke et al. |
| 7,247,183 B2 | 7/2007 | Connor et al. |
| 7,258,719 B2 | 8/2007 | Miller et al. |
| 7,282,075 B2 | 10/2007 | Sporre et al. |
| 7,314,558 B1 | 1/2008 | Jaroszczyk et al. |
| 7,323,105 B1 | 1/2008 | Janikowski et al. |
| 7,323,106 B2 | 1/2008 | Jaroszczyk et al. |
| 7,338,544 B2 | 3/2008 | Sporre et al. |
| 7,351,270 B2 | 4/2008 | Engelland et al. |
| 7,396,371 B2 | 7/2008 | Nepsund et al. |
| 7,396,375 B2 | 7/2008 | Nepsund et al. |
| 7,488,365 B2 | 2/2009 | Golden et al. |
| 7,494,017 B2 | 2/2009 | Miller |
| 7,540,895 B2 | 6/2009 | Furseth et al. |
| D600,790 S | 9/2009 | Nelson et al. |
| 7,588,619 B2 | 9/2009 | Chilton et al. |
| 7,625,419 B2 | 12/2009 | Nelson et al. |
| 7,648,546 B2 | 1/2010 | Haberkamp et al. |
| 7,655,074 B2 | 2/2010 | Nepsund et al. |
| 7,682,416 B2 | 3/2010 | Engelland et al. |
| 7,799,108 B2 | 9/2010 | Connor et al. |
| 7,879,125 B2 | 2/2011 | Haberkamp et al. |
| 7,967,886 B2 | 6/2011 | Schrage et al. |
| 8,016,903 B2 | 9/2011 | Nelson et al. |
| 8,034,145 B2 | 10/2011 | Boehrs et al. |
| 8,062,399 B2 | 11/2011 | Nelson et al. |
| 8,241,383 B2 | 8/2012 | Schrage et al. |
| 8,277,532 B2 | 10/2012 | Reichter et al. |
| 8,292,983 B2 | 10/2012 | Reichter et al. |
| 8,328,897 B2 | 12/2012 | Nelson et al. |
| 8,357,219 B2 | 1/2013 | Boehrs et al. |
| 8,397,920 B2 | 3/2013 | Moy et al. |
| 8,480,779 B2 | 7/2013 | Boehrs et al. |
| 8,496,723 B2 | 7/2013 | Reichter et al. |
| 8,636,820 B2 | 1/2014 | Reichter et al. |
| 8,709,119 B2 | 4/2014 | Reichter et al. |
| 8,840,699 B2 | 9/2014 | Boehrs et al. |
| 8,906,128 B2 | 12/2014 | Reichter et al. |
| 9,120,047 B2 | 9/2015 | Boehrs et al. |
| 9,180,399 B2 | 11/2015 | Reichter et al. |
| 9,320,997 B2 | 4/2016 | Campbell et al. |
| 9,399,972 B2 | 7/2016 | Boehrs et al. |
| 9,527,023 B2 | 12/2016 | Reichter et al. |
| 9,795,911 B2 | 10/2017 | Reichter et al. |
| 9,937,455 B2 | 4/2018 | Boehrs et al. |
| 10,046,260 B2 | 8/2018 | Campbell et al. |
| 10,065,145 B2 | 9/2018 | Reichter et al. |
| 10,315,144 B2 | 6/2019 | Reichter et al. |
| 10,421,034 B2 | 9/2019 | Reichter et al. |
| 10,427,083 B2 | 10/2019 | Boehrs et al. |
| 10,512,868 B2 | 12/2019 | Adamek et al. |
| 10,532,310 B2 | 1/2020 | Burton et al. |
| 10,556,201 B2 | 2/2020 | Reichter et al. |
| 10,603,618 B2 | 3/2020 | Boehrs et al. |
| 10,610,816 B2 | 4/2020 | Campbell et al. |
| 10,864,475 B2 | 12/2020 | Reichter et al. |
| 11,020,699 B2 | 6/2021 | Reichter et al. |
| 11,110,382 B2 | 9/2021 | Burton et al. |
| 11,173,442 B2 | 11/2021 | Boehrs et al. |
| 11,198,083 B2 | 12/2021 | Adamek et al. |
| 11,207,632 B2 | 12/2021 | Reichter et al. |
| 11,291,943 B2 | 4/2022 | Boehrs et al. |
| 11,298,643 B2 | 4/2022 | Campbell et al. |
| 11,660,558 B2 | 5/2023 | Adamek et al. |
| 11,752,460 B2 | 9/2023 | Campbell et al. |
| 11,759,744 B2 | 9/2023 | Reichter et al. |
| 11,786,857 B2 | 10/2023 | Boehrs et al. |
| 11,826,689 B2 | 11/2023 | Reichter et al. |
| 11,951,429 B2 | 4/2024 | Reichter et al. |
| 2001/0032545 A1 | 10/2001 | Goto et al. |
| 2002/0060178 A1 | 5/2002 | Tsabari |
| 2002/0070181 A1 | 6/2002 | Deanda et al. |
| 2002/0073850 A1 | 6/2002 | Tokar et al. |
| 2002/0096247 A1 | 7/2002 | Wydeven |
| 2002/0170280 A1 | 11/2002 | Soh |
| 2002/0185454 A1 | 12/2002 | Beard et al. |
| 2002/0195384 A1 | 12/2002 | Rohrbach et al. |
| 2003/0121845 A1 | 7/2003 | Wagner et al. |
| 2003/0154863 A1 | 8/2003 | Tokar et al. |
| 2003/0217534 A1 | 11/2003 | Krisko et al. |
| 2003/0218150 A1 | 11/2003 | Blakemore et al. |
| 2004/0035097 A1 | 2/2004 | Schlensker et al. |
| 2004/0060861 A1 | 4/2004 | Winter et al. |
| 2004/0091654 A1 | 5/2004 | Kelly et al. |
| 2004/0140255 A1 | 7/2004 | Merritt et al. |
| 2004/0173097 A1 | 9/2004 | Engelland et al. |
| 2004/0187689 A1 | 9/2004 | Sporre et al. |
| 2004/0221555 A1 | 11/2004 | Engelland et al. |
| 2004/0226443 A1 | 11/2004 | Gillingham et al. |
| 2005/0019236 A1 | 1/2005 | Martin et al. |
| 2005/0166561 A1 | 8/2005 | Schrage et al. |
| 2005/0194312 A1 | 9/2005 | Niemeyer et al. |
| 2005/0224061 A1 | 10/2005 | Ulrich et al. |
| 2005/0252848 A1 | 11/2005 | Miller |
| 2006/0113233 A1 | 6/2006 | Merritt et al. |
| 2006/0180537 A1 | 8/2006 | Loftis et al. |
| 2006/0272305 A1 | 12/2006 | Morgan |
| 2007/0261374 A1 | 11/2007 | Nelson et al. |
| 2008/0011673 A1 | 1/2008 | Janikowski et al. |
| 2008/0022641 A1 | 1/2008 | Engelland et al. |
| 2008/0110142 A1 | 5/2008 | Nelson et al. |
| 2008/0250763 A1 | 10/2008 | Widerski et al. |
| 2008/0250766 A1 | 10/2008 | Schrage et al. |
| 2008/0276582 A1 | 11/2008 | Boehrs et al. |
| 2008/0307759 A1 | 12/2008 | Reichter et al. |
| 2009/0057213 A1 | 3/2009 | Schiavon et al. |
| 2009/0064646 A1 | 3/2009 | Reichter et al. |
| 2009/0151311 A1 | 6/2009 | Reichter et al. |
| 2010/0043366 A1 | 2/2010 | Boehrs et al. |
| 2010/0170209 A1 | 4/2010 | Nelson et al. |
| 2011/0186504 A1 | 8/2011 | Rocklitz |
| 2022/0047984 A1 | 2/2022 | Burton et al. |
| 2022/0118394 A1 | 4/2022 | Boehrs et al. |
| 2022/0176299 A1 | 6/2022 | Reichter et al. |
| 2023/0338883 A1 | 10/2023 | Adamek et al. |
| 2023/0405502 A1 | 12/2023 | Campbell et al. |
| 2023/0415082 A1 | 12/2023 | Reichter et al. |
| 2024/0066451 A1 | 2/2024 | Campbell et al. |

FOREIGN PATENT DOCUMENTS

| | | |
|---|---|---|
| DE | 296 13 098 | 10/1996 |
| EP | 1 233 173 A2 | 8/2002 |
| GB | 970826 | 9/1964 |
| GB | 2 082 932 A | 3/1982 |
| JP | 60-112320 | 7/1985 |
| JP | 1-171615 | 4/1989 |
| JP | 1-163408 | 11/1989 |
| JP | 2-25009 | 2/1990 |
| WO | 97/40908 | 11/1997 |
| WO | 98/12430 | 9/1998 |
| WO | 99/00587 | 7/1999 |
| WO | 01/97946 A1 | 12/2001 |
| WO | 02/092193 | 11/2002 |
| WO | 2003/084641 | 10/2003 |
| WO | 2003/095068 | 11/2003 |
| WO | 2004/052504 A2 | 6/2004 |

(56) References Cited

FOREIGN PATENT DOCUMENTS

| | | |
|---|---|---|
| WO | 2004/054684 A1 | 7/2004 |
| WO | 2005/046841 | 5/2005 |
| WO | 2005/058461 A1 | 6/2005 |
| WO | 2005/077487 A1 | 8/2005 |
| WO | 2005/079954 A1 | 9/2005 |
| WO | 2007/009039 A1 | 1/2007 |

OTHER PUBLICATIONS

Exhibit A, Allowed claims of U.S. Appl. No. 17/303,371.
Exhibit B, Pending claims of U.S. Appl. No. 18/215,382.
Exhibit C, Pending claims of U.S. Appl. No. 18/226,884.
Exhibit D, Pending claims of U.S. Appl. No. 18/239,561.
Exhibit E, Pending claims of U.S. Appl. No. 17/443,229.
Exhibit F, Pending claims of U.S. Appl. No. 18/138,384.
Exhibit A, Allowed claims of U.S. Appl. No. 18/215,382.
Exhibit B, Allowed claims of U.S. Appl. No. 18/226,884.
Exhibit C, Pending claims of U.S. Appl. No. 17/443,229.
Exhibit D, Allowed claims of U.S. Appl. No. 18/138,384.

Air Filter Arrangement; Assembly; and, Methods

This application is a continuing application of U.S. Ser. No. 17/101,996, filed Nov. 23, 2020, now U.S. Pat. No. 11,826,689. U.S. Ser. No. 17/101,996 is a continuation of U.S. Ser. No. 16/119,121, filed Aug. 31, 2018, now U.S. Pat. No. 10,864,475. USSN 16/119,121 is a continuation of U.S. Ser. No. 14/935,860, filed Nov. 9, 2015, now U.S. Pat. No. 10,065,145. USSN 14/935,860 is a continuation of U.S. Ser. No. 14/165,042, filed Jan. 27, 2014, now U.S. Pat. No. 9,180,399. U.S. Ser. No. 14/165,042 was a continuation of U.S. Ser. No. 13/952,987, filed Jul. 29, 2013, now U.S. Pat. No. 8,636,820. U.S. Ser. No. 13/952,987 was a continuation of U.S. Ser. No. 11/795,178, now U.S. Pat. No. 8,496,723. U.S. Ser. No. 11/795,178, filed 12 Jul. 2007, was a National Stage Patent Application of PCT International Patent application number PCT/US2006/001021 filed on 12 Jan. 2006 and claiming priority from 60/644,094, filed Jan. 13, 2005. The complete disclosures of the above-referenced applications are incorporated herein by reference. A claim of the priority to each of the above referenced applications is made to the extent appropriate.

FIELD OF THE DISCLOSURE

The present disclosure relates to air cleaners. The disclosure particularly relates to air cleaners with media packs that use z-filter media comprising a fluted (typically corrugated) media sheet secured to a facing sheet, formed into a media pack. More specifically, the disclosure relates to such media packs provided in serviceable filter cartridge arrangements, typically for use in air cleaners. Air cleaner arrangements, methods of assembly and use, and systems of use are also described.

BACKGROUND

Air streams can carry contaminant material therein. In many instances, it is desired to filter some or all of the contaminant material from the air stream. For example, gas flow streams to engines (for example combustion air) for motorized vehicles or for power generation equipment, gas streams to gas turbine systems and air streams to various combustion furnaces, carry particulate contaminant therein that should be filtered. It is preferred for such systems, that selected contaminant material be removed from (or have its level reduced in) that gas. A variety of air filter arrangements have been developed for contaminant rejection. However, continued improvements are sought.

SUMMARY

According to a portion of the present disclosure, features useable in air cleaners and filter cartridges for the air cleaners provided. The features can be used together to provide a system, however some advantageous arrangements can be constructed to use only selected ones of the features. In addition, methods of construction and use are provided.

In one aspect of the present disclosure, a preferred media pack is provided, for use in or as air filter cartridges. The media pack comprises a stacked z-filter arrangement having opposite flow faces and opposite sides. At a pair of the opposite sides, ends of stacked strips are sealed, for example by end pieces such as molded-in-place end pieces, although alternatives are possible. In some examples the molded end pieces would comprise molded polyurethane. Also, a useable housing seal arrangement is provided. The housing seal arrangement can be provided as a molded-in-place seal arrangement.

Also, air cleaner arrangements, which use the filter cartridge as a service component, are described. In addition, shown and described are features of an air cleaner system and for example an environment of use. Also methods of assembly and use are shown and described.

DETAILED DESCRIPTION

I. Z-Filter Media Configurations, Generally

Figure 1:
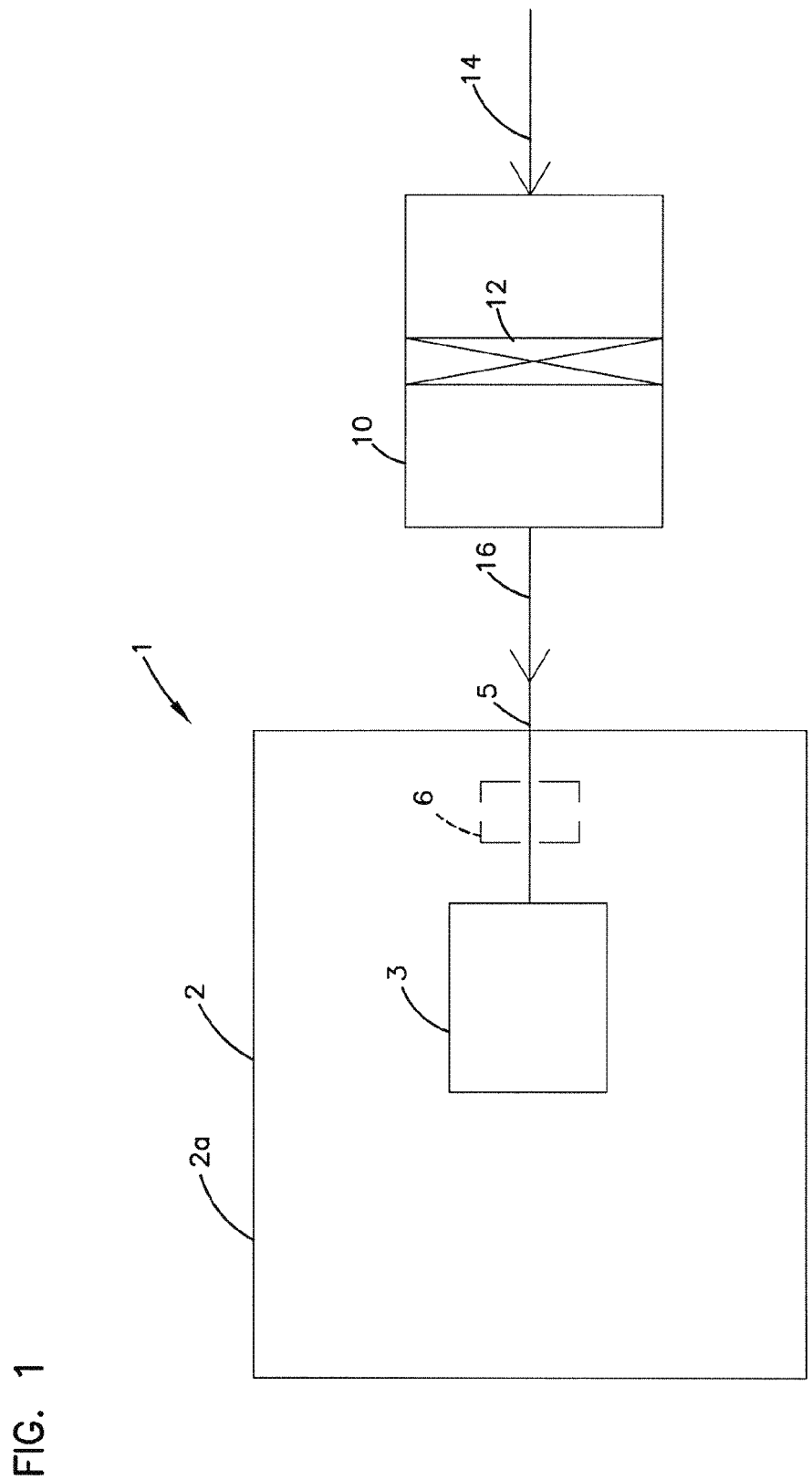
FIG. 1 is a schematic view of a system using an air cleaner assembly having a filter cartridge component according to the present disclosure.

Air cleaners according to the present disclosure utilize a z-filter media construction. In general the term "z-filter construction" as used herein, and variants thereof, is meant to refer to a filter construction in which individual ones of corrugated, folded or otherwise formed filter flutes are used to define sets of longitudinal, typically parallel, inlet and outlet filter flutes for fluid flow through the media; the fluid flowing along the length of flutes between opposite inlet and outlet ends (or flow faces) on the media, during filtering. Some examples of z-filter media are provided in U.S. Pat. Nos. 5,820,646; 5,772,883; 5,902,364; 5,792,247; 5,895,574; 6,210,469; 6,190,432; 6,350,296; 6,179,890; and 6,235,195. The complete disclosures of these 10 cited references are incorporated herein by reference.

One type of z-filter media, uses two specific separate media components which are joined together, to form a media construction. The two components are: (1) a fluted (typically corrugated) media sheet; and (2) a facing media sheet. The facing media sheet is typically non-corrugated, however it can be corrugated, for example perpendicularly to the flute direction as described in U.S. Provisional 60/543,804 filed Feb. 11, 2004, incorporated herein by reference.

In typical preferred applications as described herein, the media pack comprises stacked strips (each strip, sometimes, called a single facer strip, being a section of fluted (corrugated) sheet secured to facing sheet) each strip extending generally (or approximately) in a plane parallel to the other strips. Such arrangements are described for example in U.S. Provisional Applications 60/599,686, filed Aug. 6, 2004; 60/600,081, filed Aug. 9, 2004; 60/602,721, filed Aug. 18, 2004; and 60/616,364, filed Oct. 5, 2004, the complete disclosures of which are incorporated herein by reference. An example is described, for example, in connection with FIG. 6 of U.S. Provisional 60/616,364, and related descriptions. Stacked arrangements according to the present disclosure can be made in general in accord with the descriptions therein.

Particular arrangements shown herein are "blocked" stacked arrangements, in that each end or side face of the stacked arrangement extends perpendicularly to adjacent faces. Such arrangements are shown for example in U.S. Provisional Application 60/616,364, filed Oct. 5, 2004, FIG. 6. Alternate arrangements can be used, for example, in which instead of being blocked, the layers of single facer sheet are stacked offset from one another to create a slanted arrangement.

In typical arrangements, the flutes extend between opposite flow faces, one being an inlet flow face and the opposite being an outlet flow face. Opposite ends of the strips are typically sealed, for example by being secured within end pieces. This is described in U.S. Provisional Patent Application 60/616,364, at FIG. 64, for example.

A housing seal is provided between the media pack and the air cleaner housing, as described below.

II. Manufacture of Stacked Media Configurations Using Fluted Media, Generally

A process for manufacturing stacked media configurations using fluted media, is described in U.S. Provisional Application 60/616,364 in section II. Such techniques can be utilized to generate media packs useable in arrangements according to the present disclosure.

III. An Example Air Cleaner System, FIGS. 1-13

A. General System of Use.

The principles and arrangements described herein are useable in a variety of systems. One particular system is depicted schematically in FIG. 1, generally at 1. In FIG. 1, equipment 2, such as a vehicle 2a having an engine 3 with some defined rated air flow demand, for example in the range of 50 cfm to 2000 cfm (cubic feet per minute) (i.e., 1.4-57 cubic meters/minute) is shown schematically. Although alternatives are possible, the equipment 2 may, for example, comprise a bus, an over-the-highway truck, an off-road vehicle, a tractor, a light-duty or medium-duty truck, or a marine vehicle such as a power boat. The engine 3 powers the equipment 2 upon fuel combustion. In FIG. 1, air flow is shown drawn into the engine 3 at an air intake at region 5. An optional turbo 6 is shown in phantom, as optionally boosting the air intake to the engine 3. The turbo 6 is shown downstream from an air cleaner 10, although alternate arrangement are possible.

The air cleaner 10 has a serviceable (i.e., removable and replaceable) filter cartridge 12 and is shown in the air inlet stream to the engine 3. In general, in operation, air is drawn in at arrow 14 into the air cleaner 10 and through the filter cartridge 12. Upon passage through the air cleaner 10, selected particles and contaminants are removed from the air. The cleaned air then flows downstream at arrow 16 into the intake 5. From there, the air flow is directed into the engine 3.

In a typical air cleaner 10, the filter cartridge 12 is a serviceable component. That is, the cartridge 12 is removable and replaceable within the air cleaner 10. This allows the cartridge 12 to be serviced, by removal and replacement, with respect to remainder of air cleaner 10, when the cartridge 12 becomes sufficiently loaded with dust or other contaminant, to require servicing.

B. An Example Air Cleaner Arrangement, FIGS. 2-13.

Figure 2:
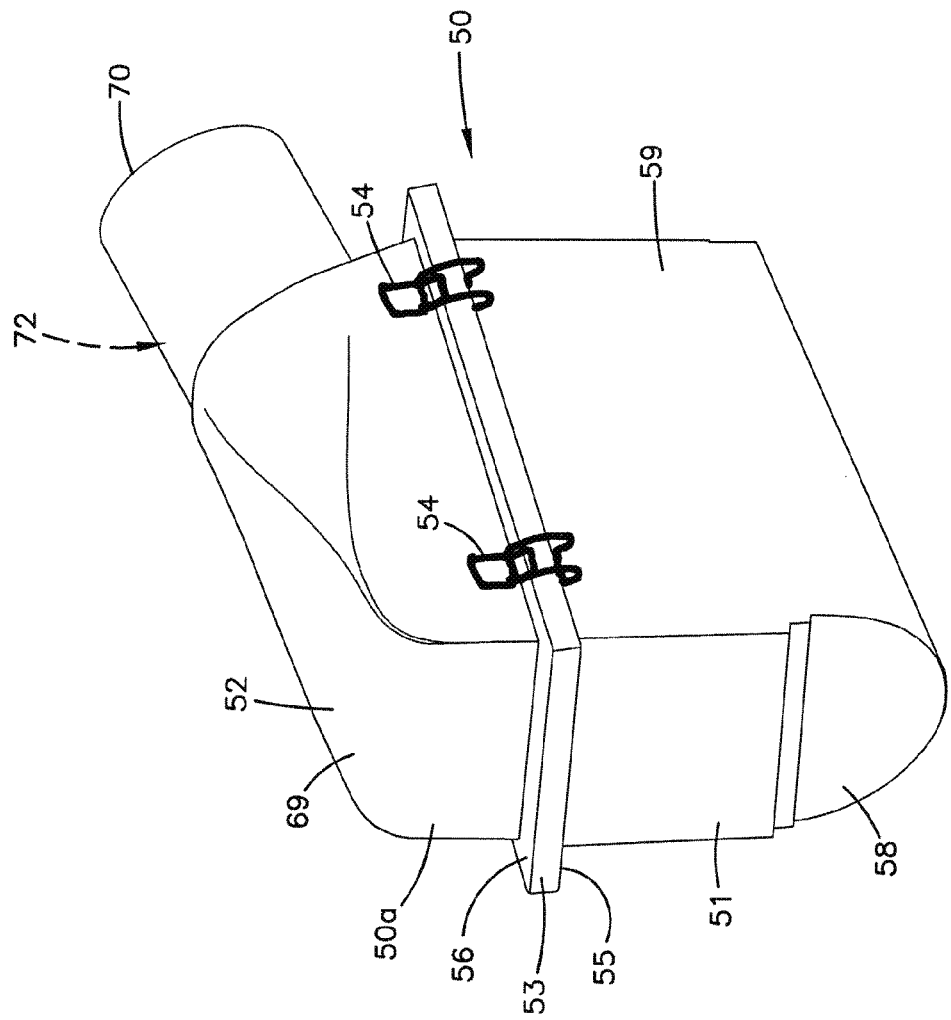
FIG. 2 is a schematic perspective view of an air cleaner assembly according to the present disclosure.

In FIG. 2, a cross-sectional, schematic, view of an air cleaner arrangement according to the present disclosure. Referring to FIG. 2, air cleaner arrangement 50 comprises housing 50a including inlet section 51 and outlet section 52. The inlet section 51 and outlet section 52 are secured to one another along housing separation region 53. Clamps 54 or other arrangements, can be used to secure connection at separation region 53.

For the arrangement shown, housing separation region 53 comprises a flange 55 on the inlet section 51, and a flange 56 on the outlet section 52 sized and configured to engage one another. Unhooking clamps 54 allows separation of flanges 55, 56 (and thus sections 51, 52) to obtain service access to an interior of housing 50a.

The inlet section 51 includes an air flow inlet 58 and a filter cartridge receiving section 59. The outlet section 52 includes a filter cartridge receiving section 69 and an outlet tube 70.

For the particular arrangement shown, the inlet tube 58 and outlet tube 70 extend in generally opposite directions from one another. Alternate constructions are possible.

In a typical assembly, inside of outlet tube 70, or in related duct work, at or near region 72, a probe of a mass air flow sensor system (MAFS) could be positioned, to evaluate air flow in outlet tube 70.

Figure 3:
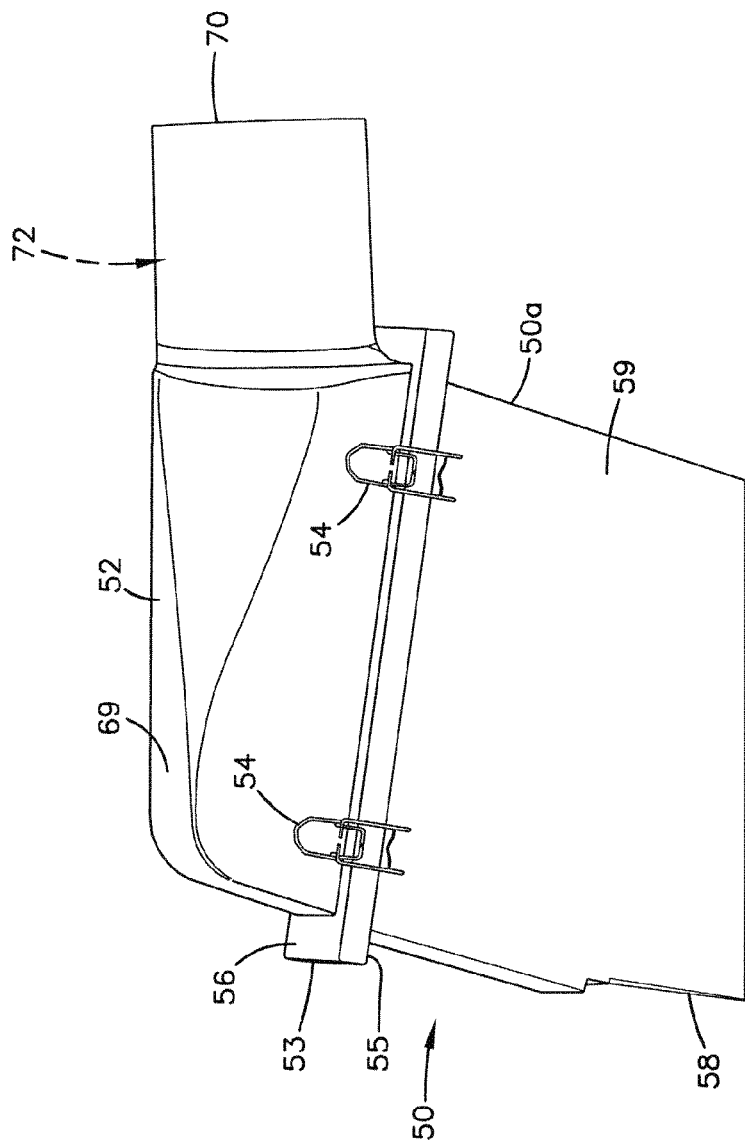
FIG. 3 is a side elevational view of the air cleaner assembly depicted in FIG. 2.
Figure 4:
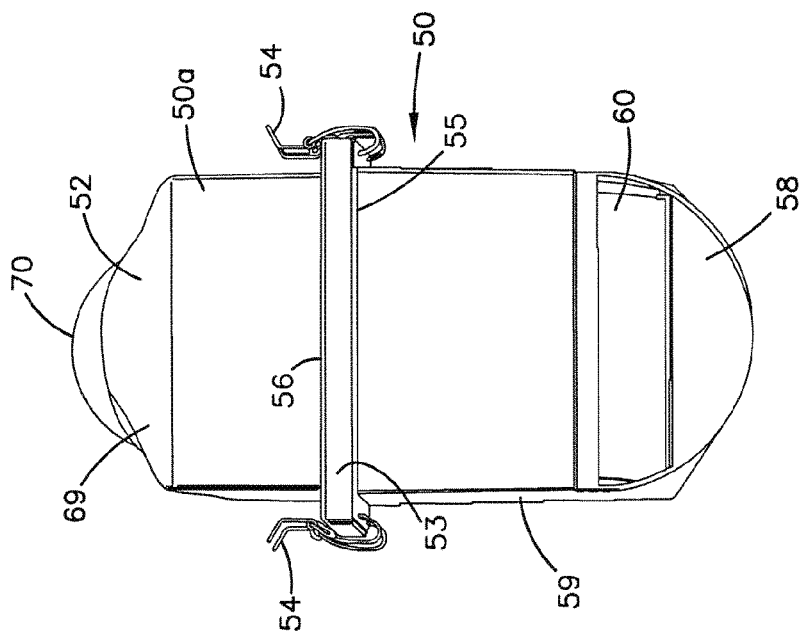
FIG. 4 is an inlet end view of the air cleaner assembly depicted in FIGS. 2 and 3.

In FIG. 3, a side elevational view of air cleaner arrangement 50 is shown. In FIG. 4 an end view of air cleaner 50, directed toward inlet 58 is shown. In FIG. 4, a portion of a filter cartridge 60 positioned inside of air cleaner housing 50a is shown.

Figure 5:
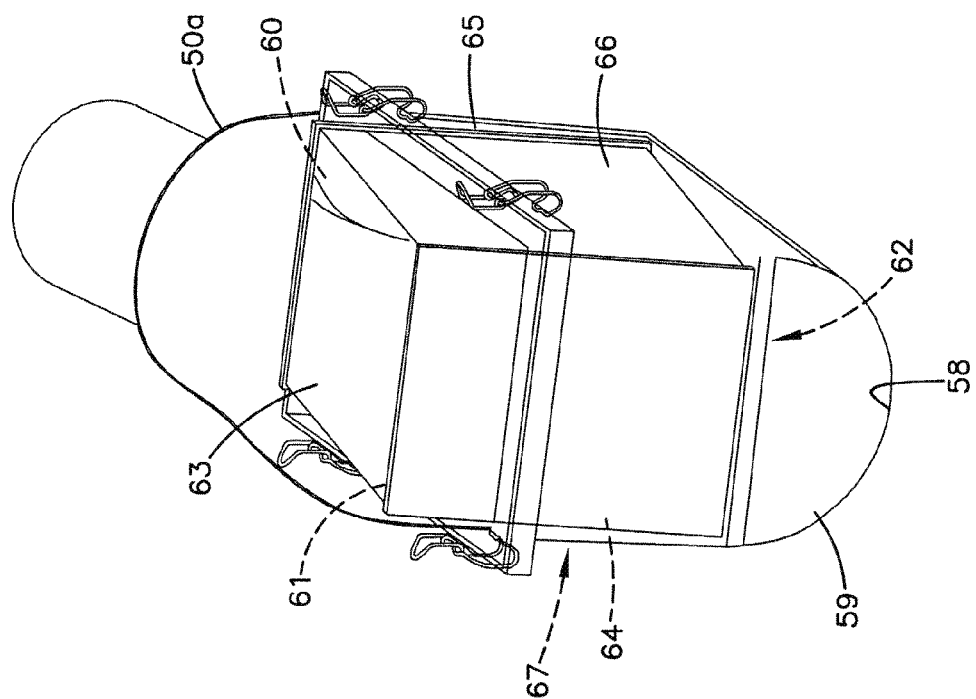
FIG. 5 is a schematic view of the air cleaner assembly depicted in FIGS. 2-4, with a housing portion shown in see-through to allow viewing of a positioning of an internally received filter cartridge component.

In FIG. 5, a schematic depiction of housing 50a is shown, with the housing 50a shown in a see-through form, so internally positioned filter cartridge 60 can be seen. Referring to FIG. 5, cartridge 60 comprises a z-filter media pack 61 having a inlet face 62, an outlet face 63, opposite ends 64, 65 and a pair of opposite faces 66, 67. Ends 64, 65 generally correspond to end sealant portions closing ends of single facer media forming the media pack 60.

Opposite faces 66, 67 are shown substantially uncovered, however a sheet of material or protective covering could be provided at these locations.

Generally, air is filtered by entering media pack 61 at inlet face 62 and exiting at opposite outlet face 63.

Figure 6:
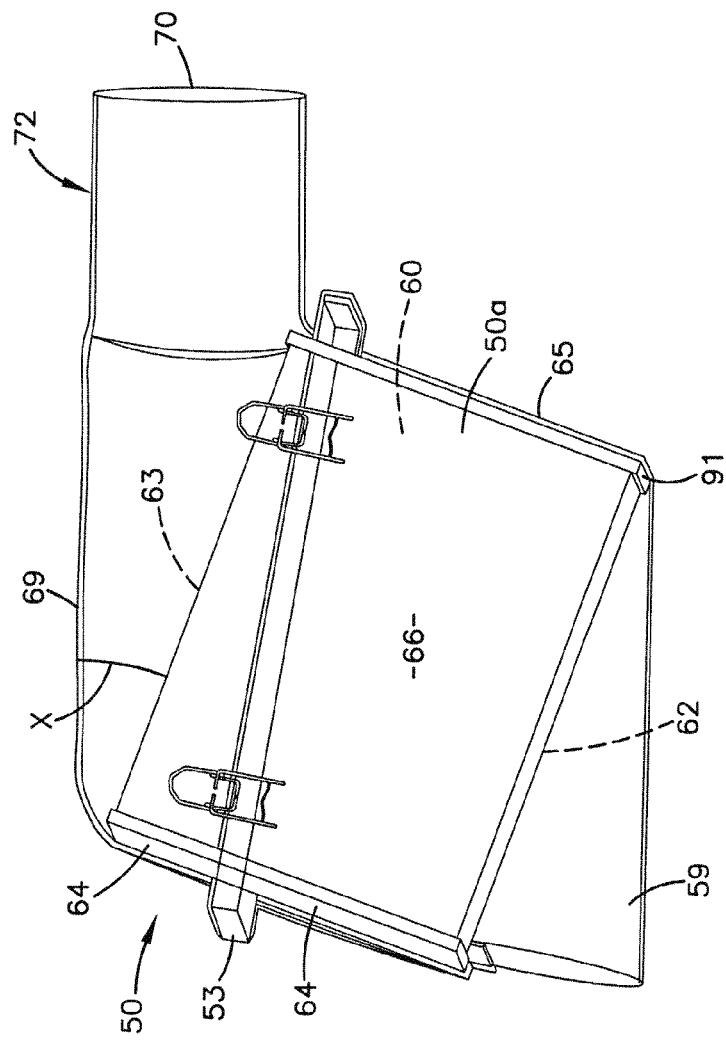
FIG. 6 is a side elevational view of the arrangement depicted in FIG. 5.
Figure 7:
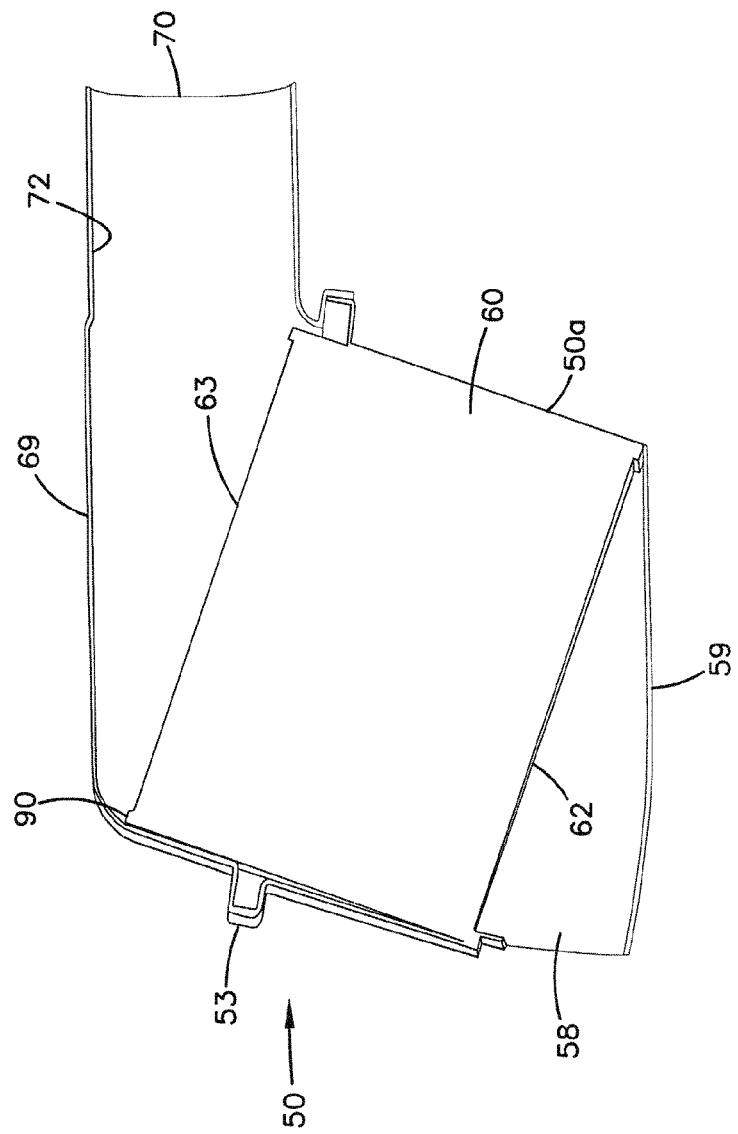
FIG. 7 is a cross-sectional view of the arrangement depicted in FIG. 6.

In FIG. 6, a side elevational view of the arrangement 50 as shown in FIG. 5, is depicted. In FIG. 7, a cross-sectional view of the arrangement shown in FIG. 6 is depicted.

It is desirable to configure air cleaner housing 50a and to position cartridge 60 therein, in a manner avoiding undesirable levels of air turbulence in region 72, which would negatively effect the operation of the MAFS. This is facilitated by:

1. Providing a stacked arrangement for cartridge 60 in which a coiled arrangement of corrugated media secured to facing media is avoided, but rather stacked strips of corrugated sheet secured to facing sheets are used, with each strip positioned at least approximately in a plane parallel to other strips.
2. Positioning outlet flow face 63, FIG. 6, partially angled toward outlet tube 70 as opposed to within a plane of separation region 53. Preferably the angle X between the outlet flow face 63 and outlet tube 70 is at least 10° typically at least 15° and often within the range of 15° to 80°, inclusive, for example 15°-40°, inclusive. A variety of arrangements can be used to position the cartridge 60 as shown schematically in FIG. 2.

Figure 8:
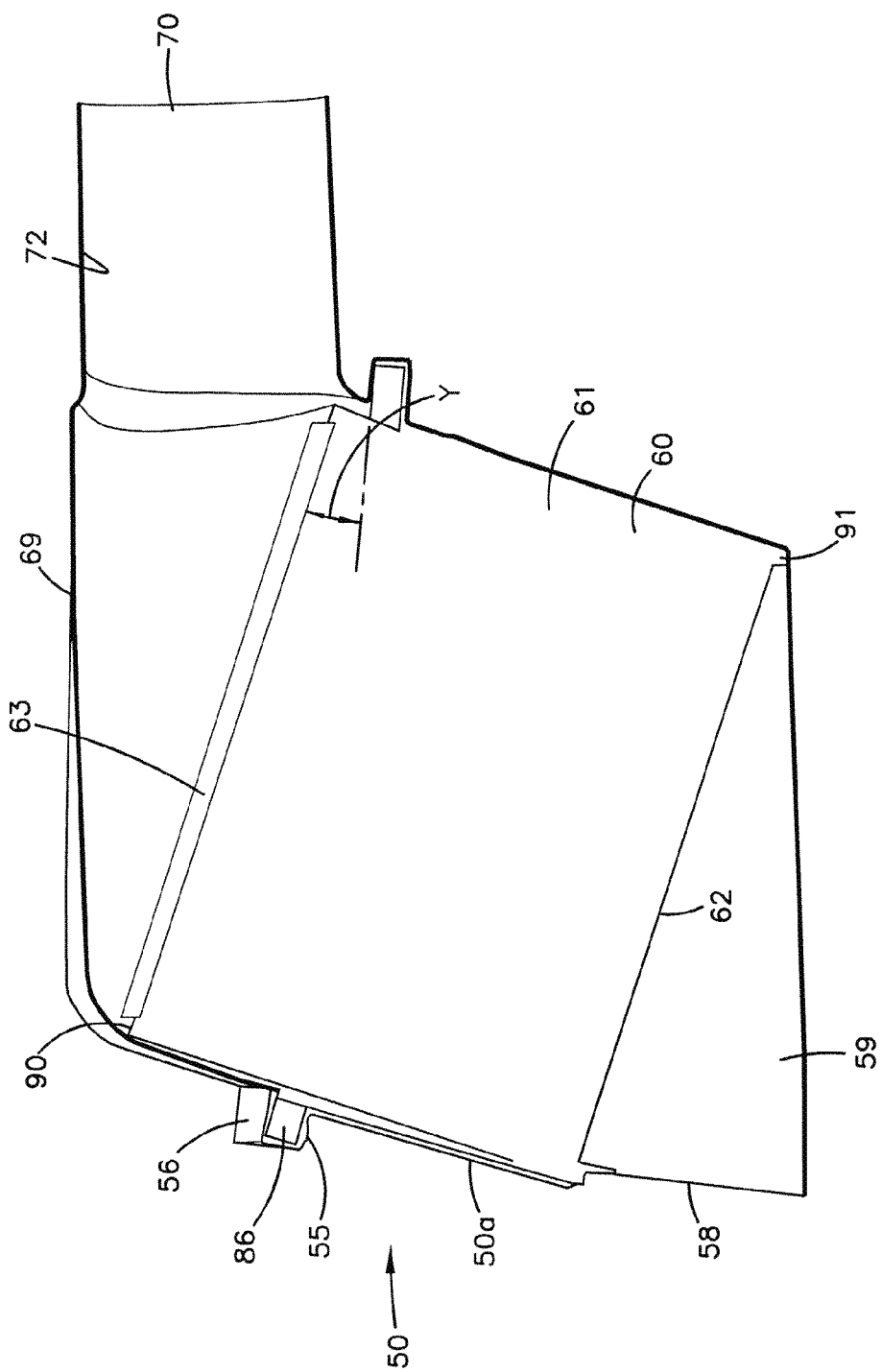
FIG. 8 is a schematic cross-sectional view analogous to FIG. 7, showing a possible housing seal location.

An example of mounting is shown in FIG. 8. Referring to FIG. 8, housing seal arrangement 80 is shown on media pack 61 of cartridge 60. The seal arrangement 80 could be configured to be positioned between flanges 55, 56, for sealing. The seal arrangement 80 is positioned in a plane not parallel to inlet face 62 and outlet face 63, in extension across a face that would correspond to the face viewable at 66, FIG. 6. In general, this face would comprise a first one of a sheet of facing or fluted (typically corrugated) material, and the opposite face, typically, a second one of sheet of facing or fluted (typically corrugated) material, although coverings or other materials can be provided.

The angle between the seal arrangement 80 and the outlet face 63 is generally shown at Y, FIG. 8, and would typically be at least 5° and usually within the range of 8° to 45°, inclusive, for example 8°-20°, inclusive.

It is noted that for the arrangement of FIGS. 1 and 2, at least 10% of the volume of the media pack 81 is positioned in each of: the inlet section 51 and the outlet section 52. Often at least 15% of each is so located.

Referring to FIG. 7, it is noted that for the arrangement shown, apex 90 of cartridge 61 is positioned at a highest location. Apex 90 comprises a corner or vertex formed between outlet flow face 63 and end 64.

Similarly, apex 91 is positioned in section 59, i.e., at a lowest location. Apex 91 comprises a corner diagonally opposite apex 90, and comprises a corner between inlet face 62 and end 65.

Figure 9:
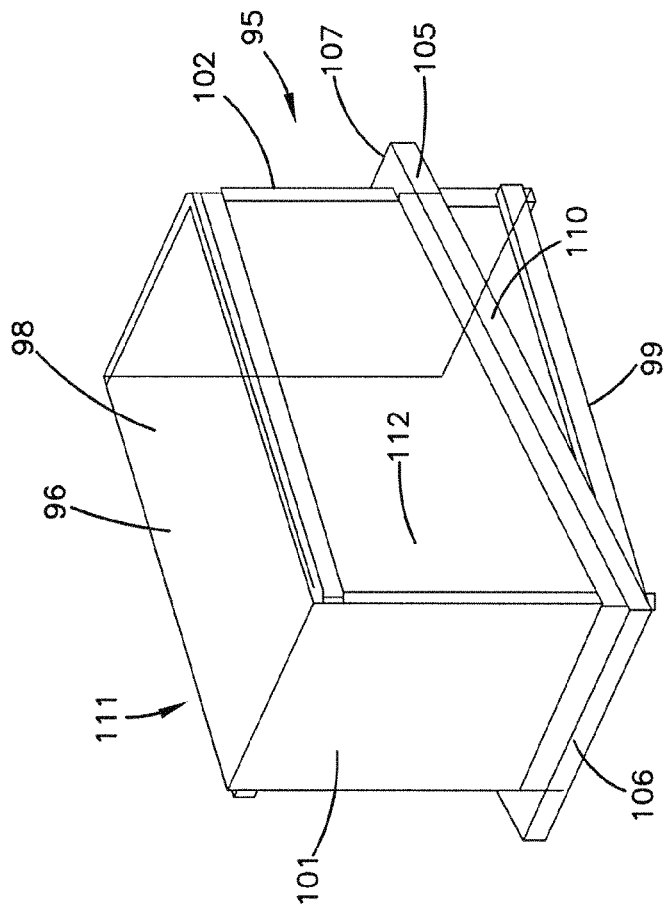
FIG. 9 is a schematic perspective view of a filter cartridge usable in the arrangement of FIG. 8.

Attention is now directed to FIG. 9. In FIG. 9 a schematic perspective view of the filter cartridge 95, useable as cartridge 60. Referring to FIG. 9, cartridge 95 comprises media pack 96 with opposite flow faces 98, 99. The media pack 96 would typically and preferably comprise a blocked stacked arrangement of z-filter media strips, each strip comprising a section of corrugated sheet secured to a section of facing sheet. Ends of the strips form opposite end faces 101, 102. The end faces 101, 102 would typically be sealed, for example by covering with end pieces as shown.

Housing seal arrangement 105 is viewable. The housing seal arrangement 105 includes sections 106, 107 extending across ends 101, 102, respectively. It also includes an extension 110 and opposite extension 111, not viewable in FIG. 9, for engagement with the housing.

Figure 10:
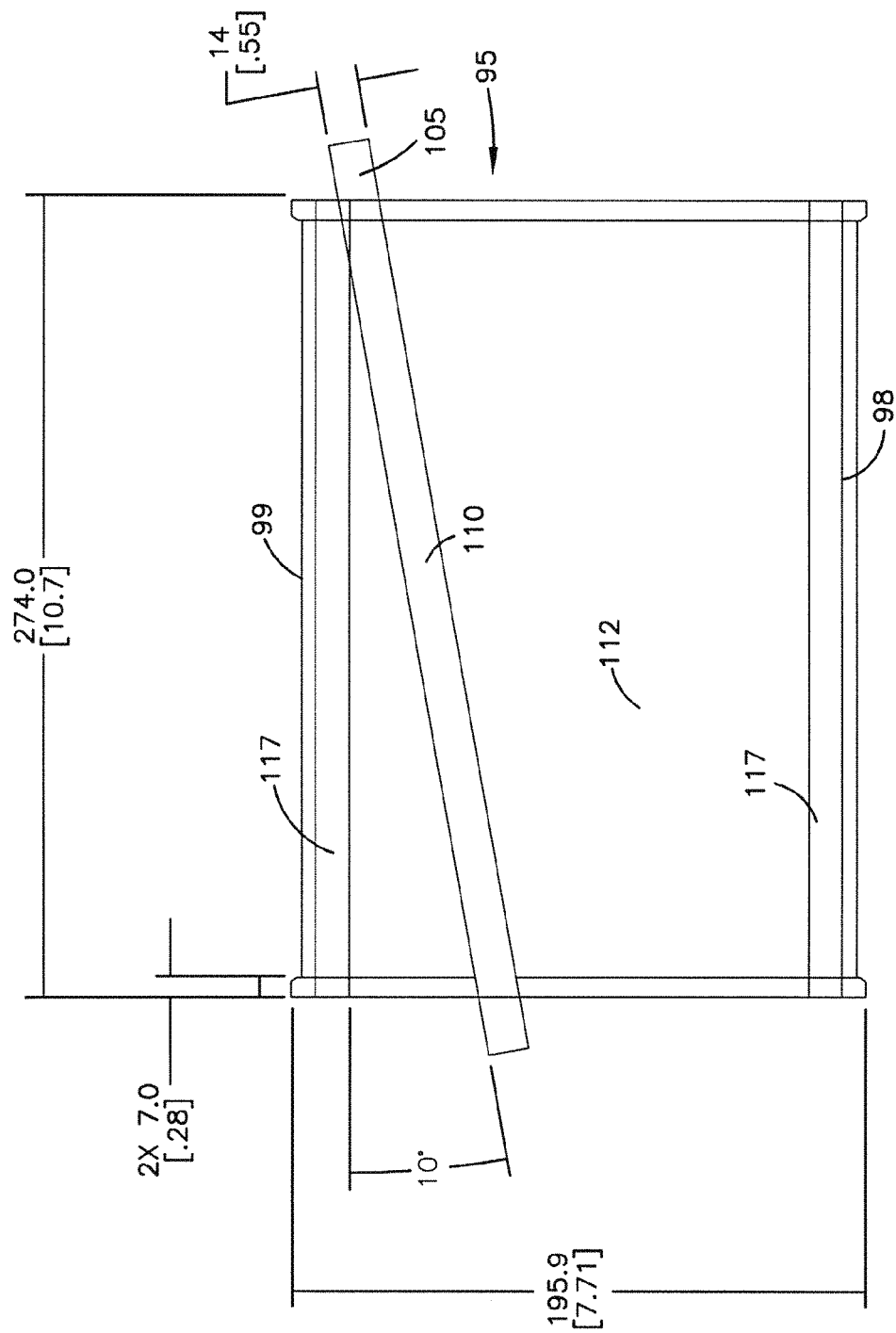
FIG. 10 is a side view of the arrangement shown in FIG. 9.

In FIG. 10, the side view of cartridge 95 is depicted. The view of FIG. 10 would be toward side 112, FIG. 9, but inverted. In FIG. 10, a pair of spaced extensions or spacers 117, extending between ends 101, 102 is viewable. A second pair could also be positioned oppositely, i.e., on a surface 113, FIG. 11, opposite to surface 112.

Figure 11:
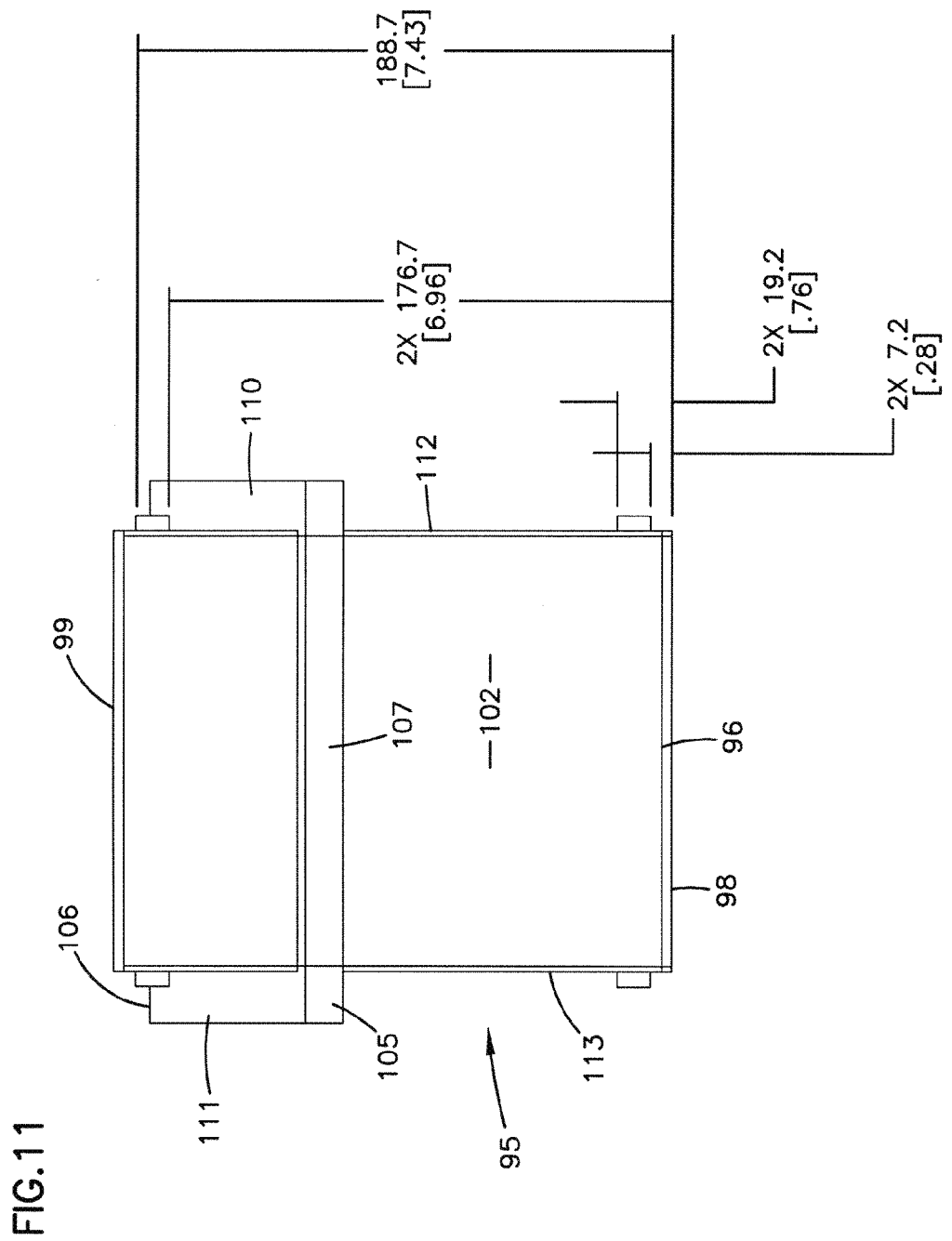
FIG. 11 is an end view of the arrangement shown in FIG. 9.
Figure 12:
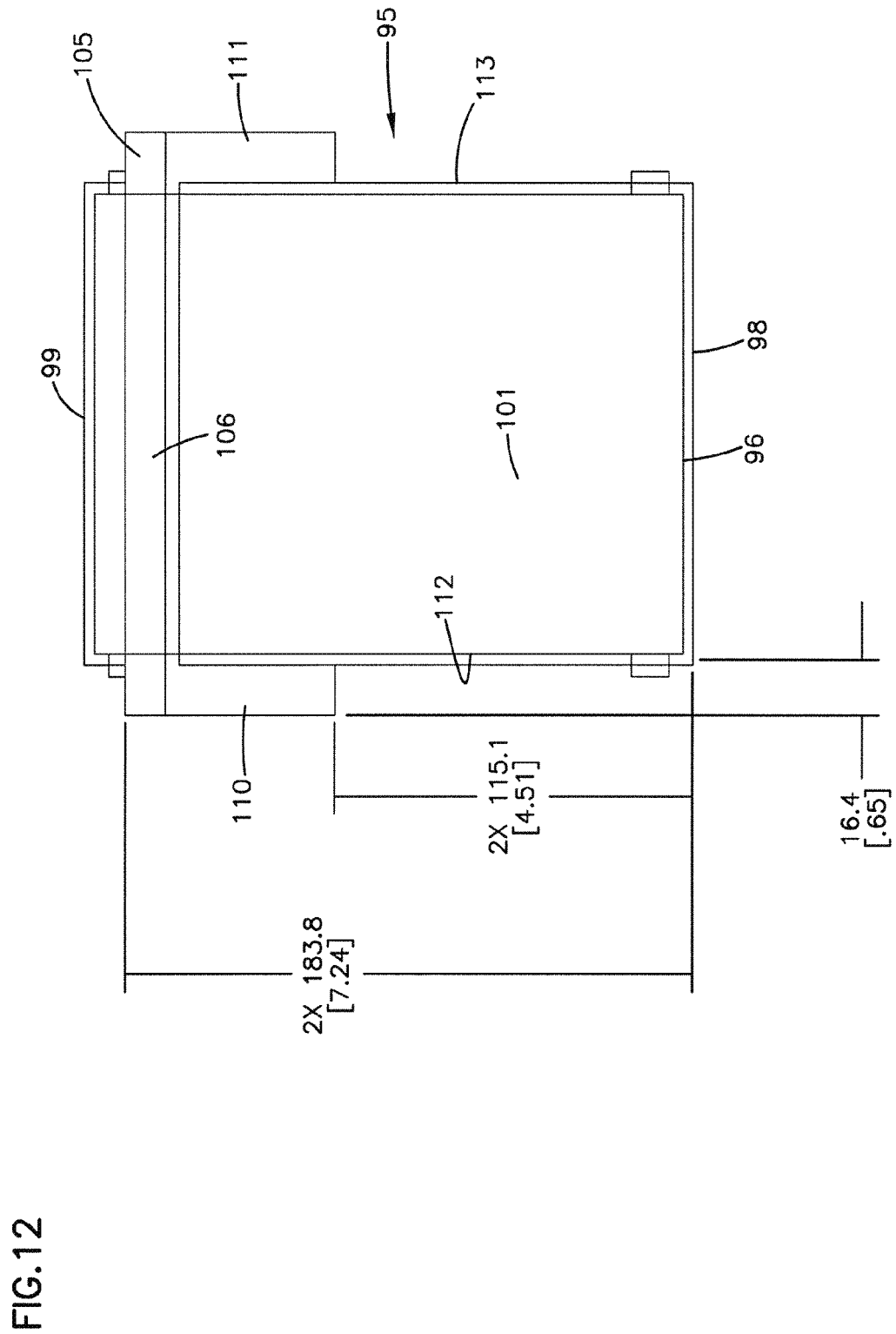
FIG. 12 is an opposite end view from FIG. 11.
Figure 13:
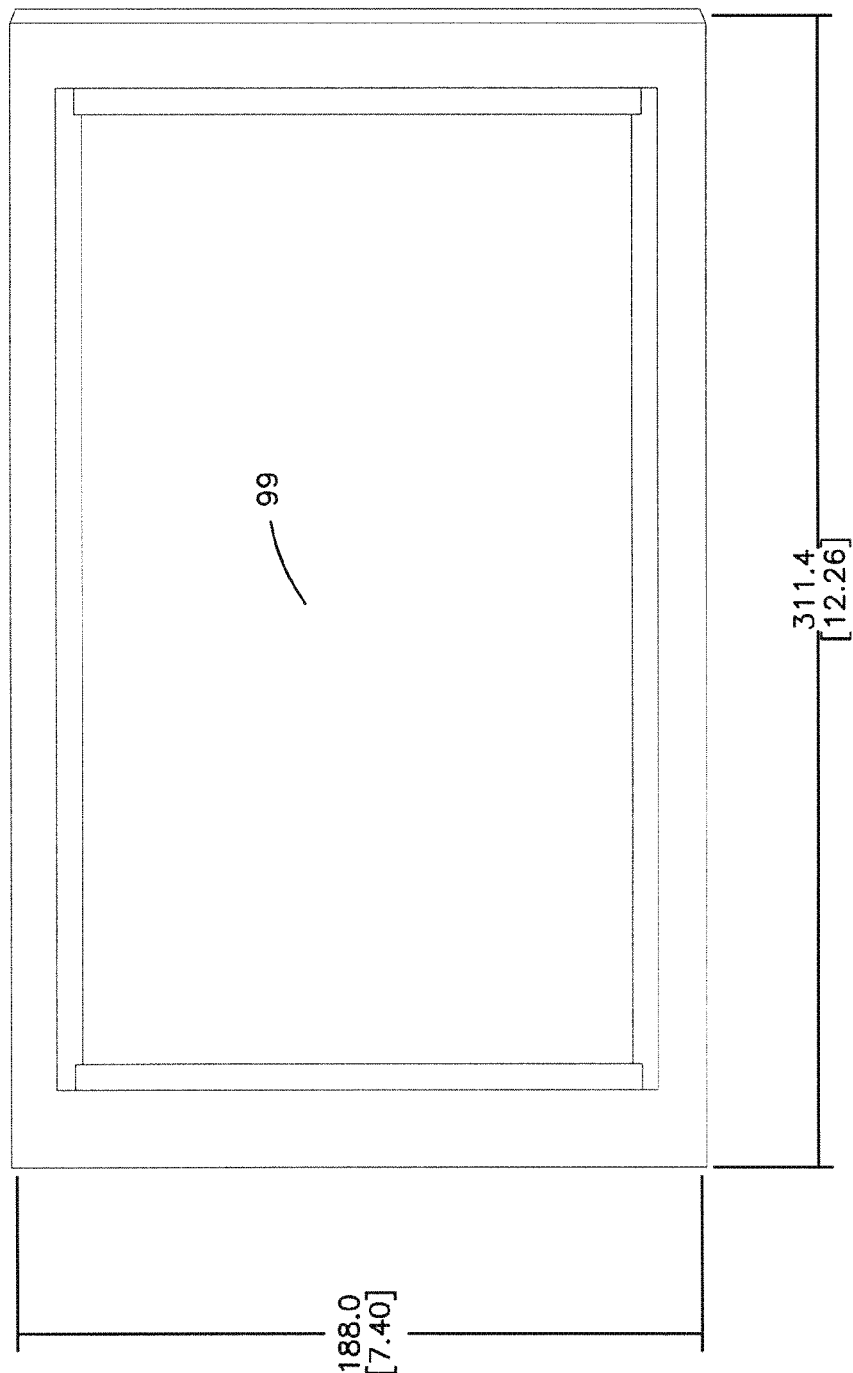
FIG. 13 is a view of an air flow face of the arrangement of FIG. 9.
Figure 15:
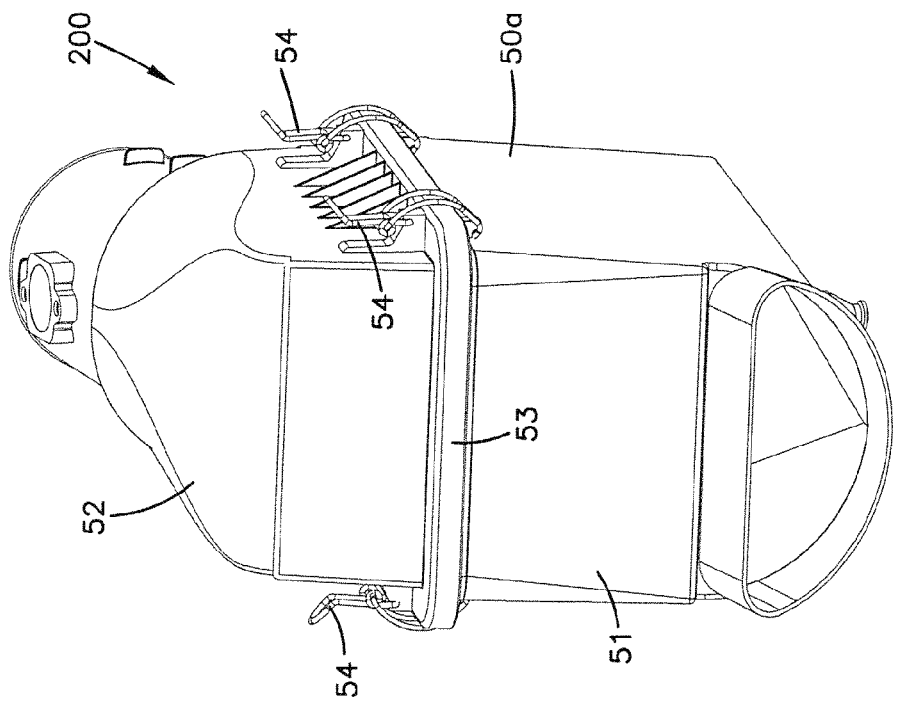
FIG. 15 is an end perspective view of the air cleaner of FIG. 14.
Figure 14:
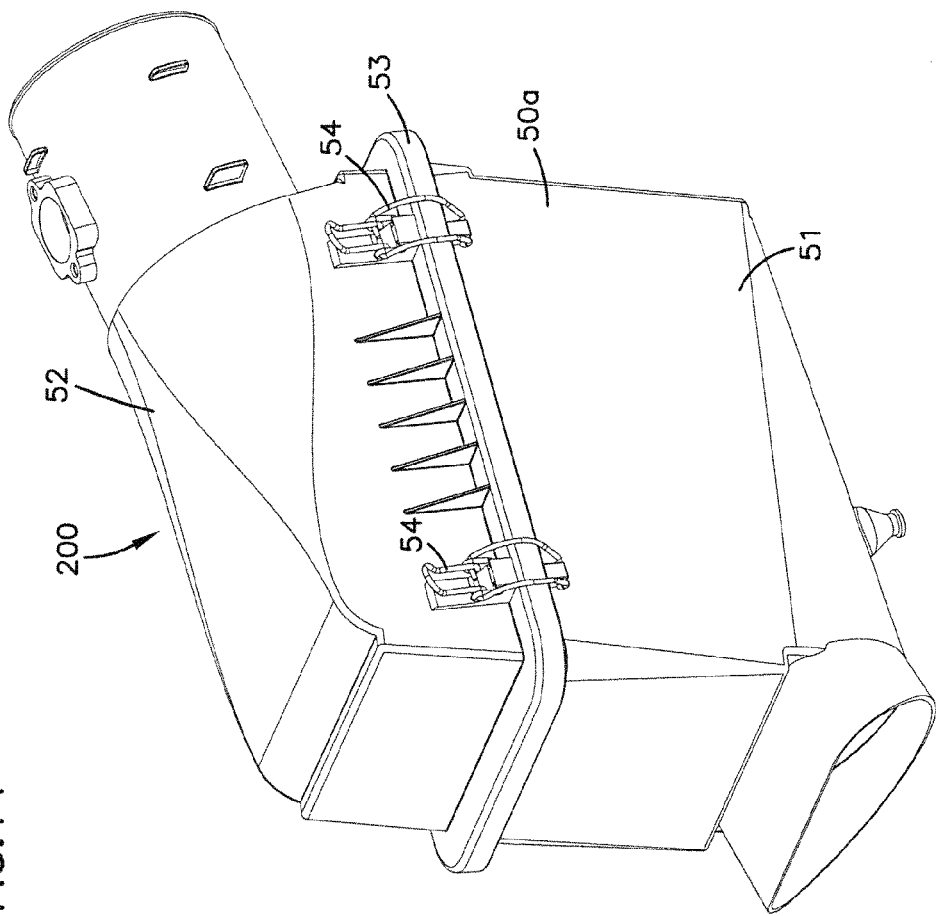
FIG. 14 is a side perspective view of a second air cleaner according to the present disclosure.
Figure 17:
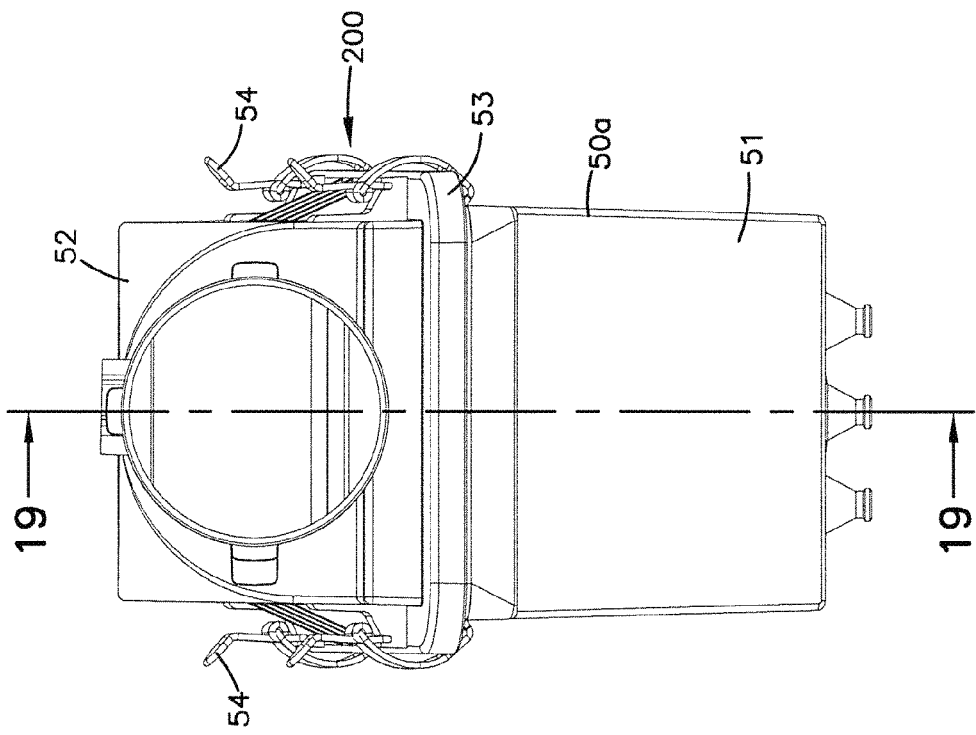
FIG. 17 is an outlet end elevational view of the air cleaner of FIGS. 14 and 15.
Figure 16:
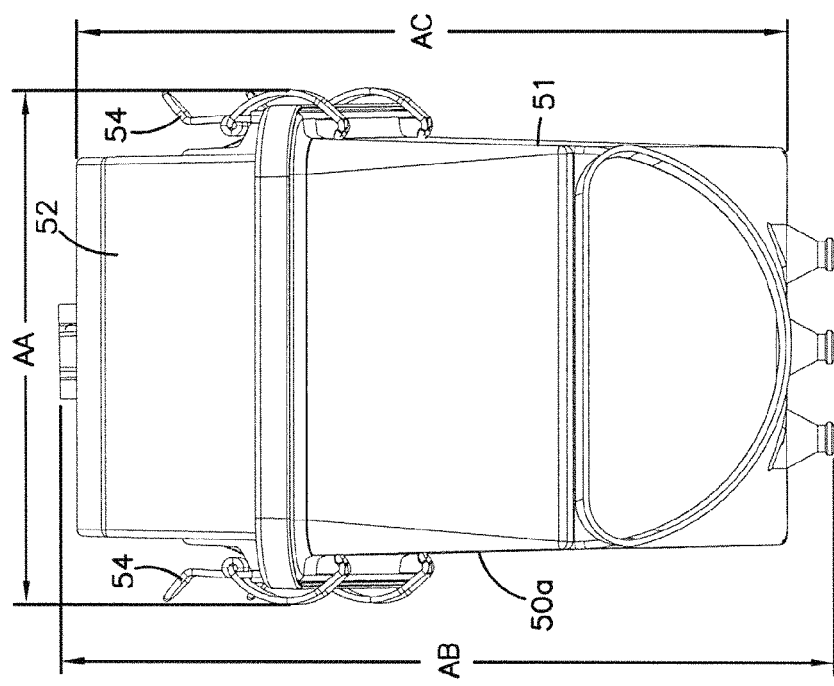
FIG. 16 is an inlet end elevational view of the air cleaner of FIGS. 14 and 15.
Figure 18:
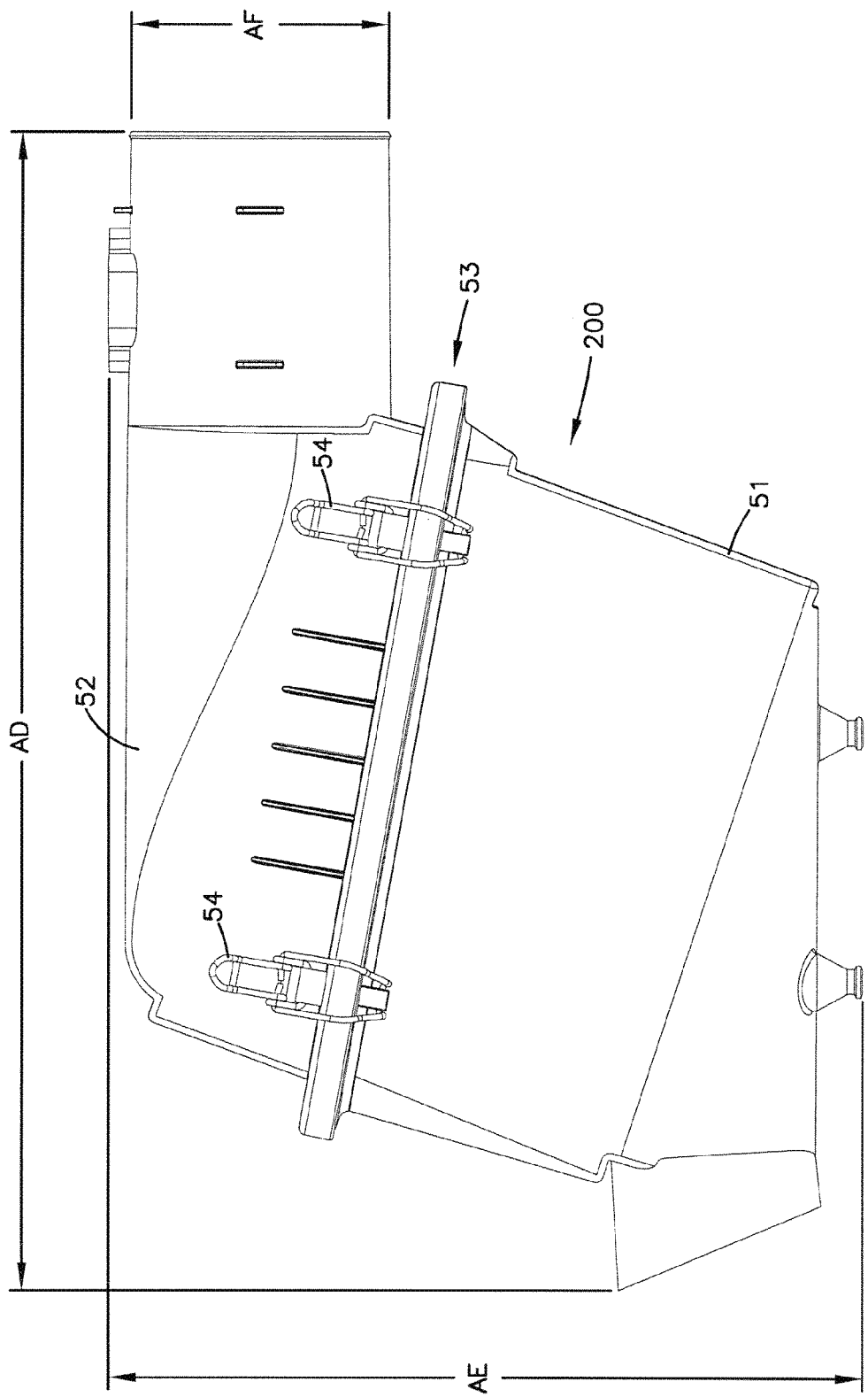
FIG. 18 is a side elevational view of the air cleaner of FIGS. 14-17.

In FIG. 11, a view toward end section 107 is provided. In FIG. 12 the view is toward end section 106 (inverted relatively to FIG. 9). In FIG. 13 the view toward outlet face 99 is shown.

In FIGS. 10-13, dimensions are shown in millimeters (and inches in brackets) to indicate an example size. Of course a variety of alternate sizes can be made.

IV. A Second Example Air Cleaner Systems, FIGS. 14-23

Figure 19:
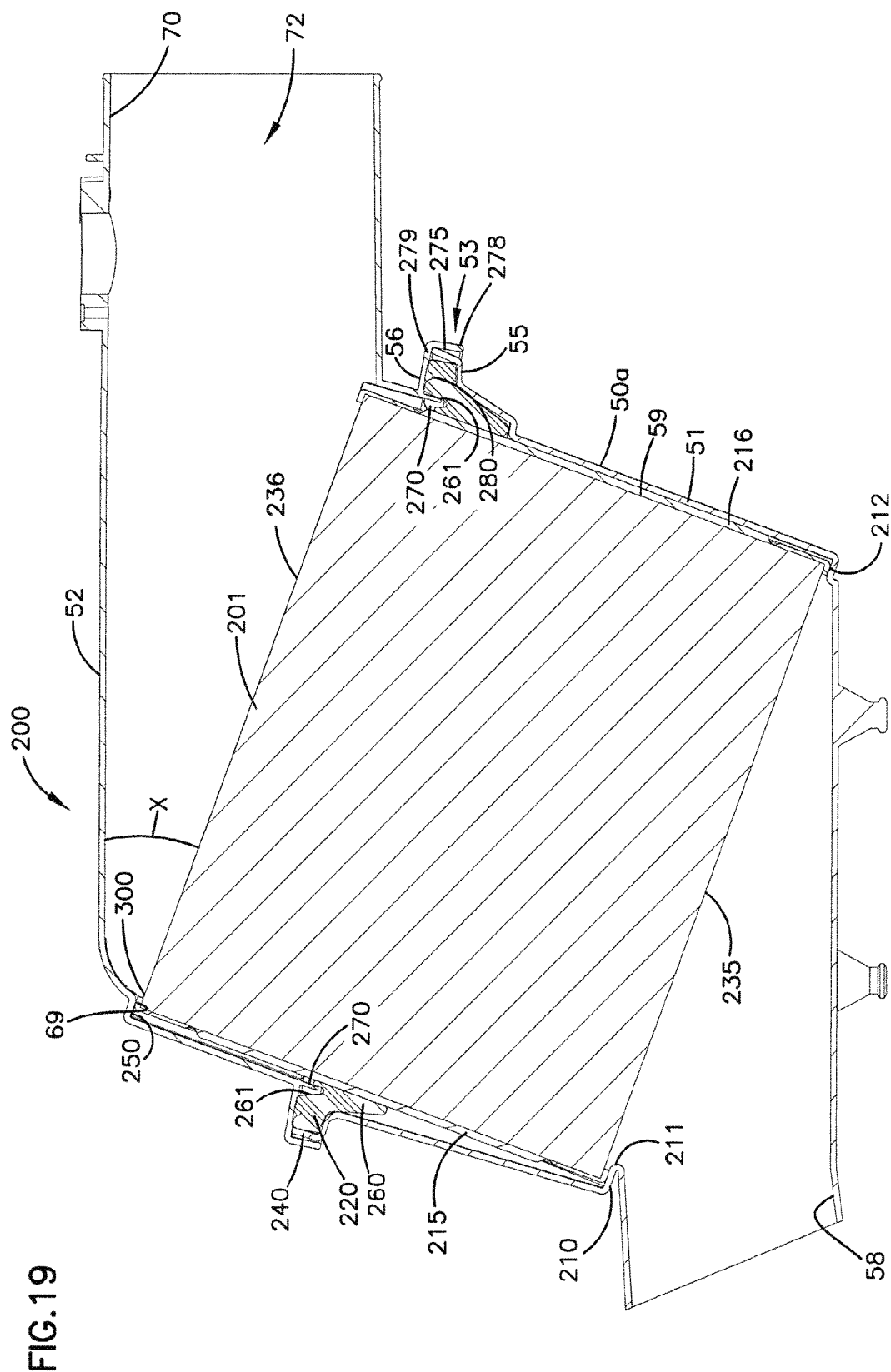
FIG. 19 is a cross-sectional view taken along line 19-19, FIG. 17.

In FIGS. 14-23, a second example air cleaner system is depicted. In FIGS. 14-19, the air cleaner assembly 200 is viewable. In FIGS. 20-23, a removable and replaceable filter cartridge 201 useable in the air cleaner 200 is provided. Many of the features of the air cleaner 200 are analogous features to those discussed previously for air cleaner 50, FIGS. 2-8, and many of the features are provided with the same reference numerals in FIGS. 14-19. Thus the air cleaner arrangement 200 comprises housing 50a including an inlet section 51 and an outlet section 52. The inlet section 51 and outlet section 52 are secured to one another along housing separation region 53. Clamps 54 are used to secure separation region 53. Referring to FIG. 19, the housing separation 53 comprises a flange 55 on the inlet section 51, and a flange 56 on the outlet section 52, sized and configured to engage one another. Unhooking clamps 54, FIGS. 14-18, allow separation of flanges 55, 56 (and thus section 51 and 52) to obtain service access to an interior housing 50a. This allows for servicing of cartridge 201, for example by replacement, FIG. 19.

The inlet section 51 includes an air flow inlet 58 and a filter cartridge receiving section 59. The outlet section 52 includes a filter cartridge receiving section 69 and an outlet tube 70. For the particular arrangement shown, the inlet tube 58 and outlet tube 70 extend in generally opposite directions from one another. Alternate constructions are possible.

In the assembly, inside the tube 70, (or in a related duct work), at or near region 72, a probe of a mass air flow sensor system (MAFS) could be positioned, to evaluate air flow in outlet tube 70.

Referring to FIG. 19, attention is directed to the following features. First housing section 51 includes a lower support ledge or shelf arrangement 210 comprising shelves 211 and 212. When filter cartridge 201 is positioned within housing 50a, opposite side panels 215, 216 will respectively rest on ledges 211, 212, for support. Thus cartridge 201 is not suspended by the seal arrangement 220. Rather, the cartridge 201 is supported by engagement of the panels 215, 216 with the ledge arrangement 210.

Figure 20:
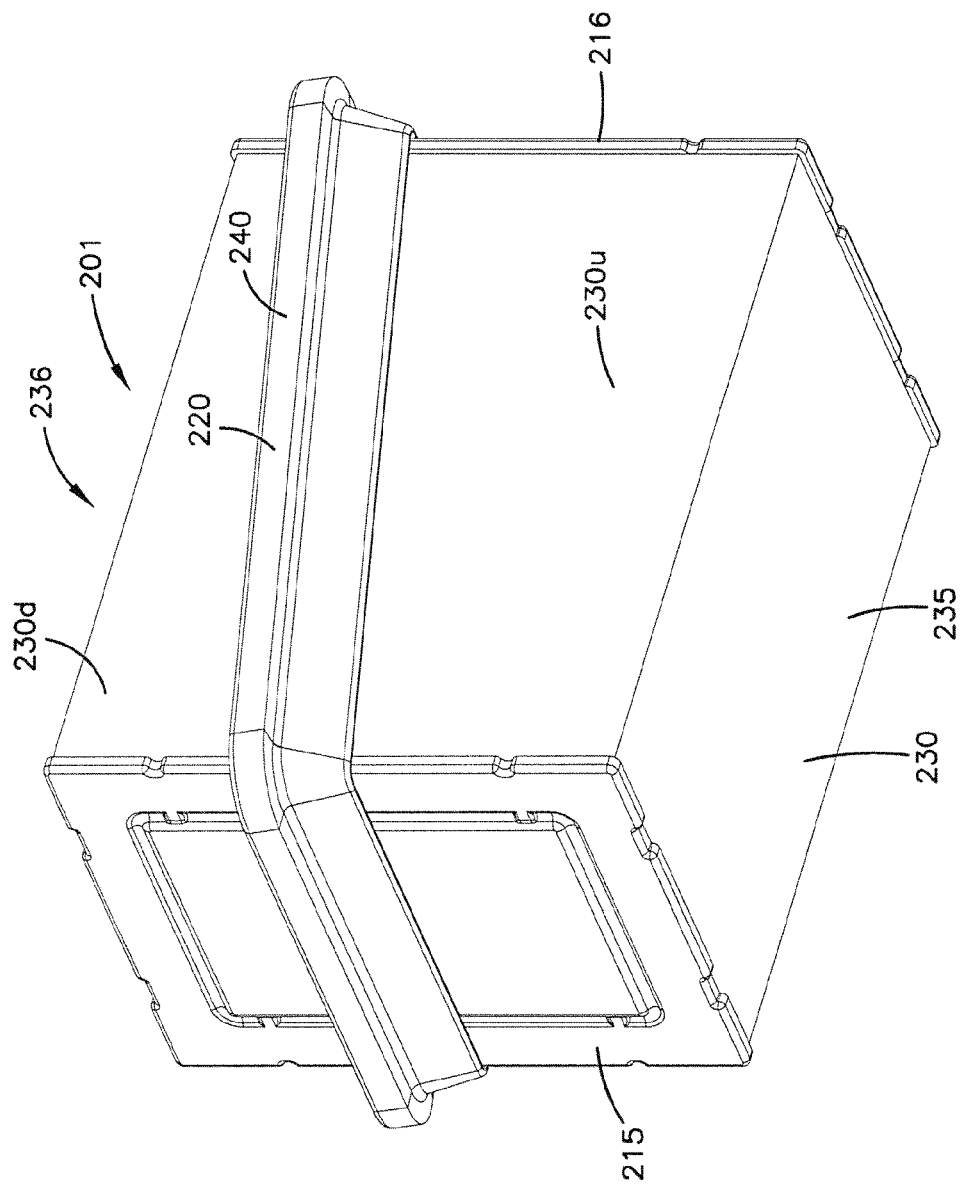
FIG. 20 is a schematic perspective view of a filter cartridge useable in the air cleaner of FIGS. 14-19.

The filter cartridge 201 will be generally understood by reference to FIGS. 20-23. Referring first to FIG. 20, cartridge 201 comprises a media pack 230 having side panels 215 and 216. The media pack 230 would generally comprise a stacked arrangement of single facer material comprising fluted (corrugated) media secured to facing media with opposite upstream and downstream flute seal arrangements appropriate to define a series of inlet flutes and outlet flutes extending between opposite faces 235, 236 in accord with previous discussions. This prevents unfiltered air entering face 235 from leaving via face 236, without passage through media, for filtering. The particular media pack 230 depicted schematically in FIG. 20, is a "blocked" stacked arrangement, again meaning that no face or side is slanted, rather each engages adjacent ones at 90° angles. Of course, as discussed above slanted arrangements are possible with the principles described herein.

For the particular example shown in FIG. 20, face 235 would be an inlet face for air flow, and opposite face 236 would be an outlet face for filtered air. The panels 215, 216 would typically and preferably be molded-in-place, to seal ends of the single facer strips within the media pack 230. Typically panels 215, 216 would be molded from a polyurethane such as a foamed polyurethane.

In a typical construction approach, the same mold would be used for panels 215, 216, with two molding steps.

Referring to FIG. 20, filter cartridge 201 includes peripheral, perimeter housing seal arrangement 220 thereon. The particular seal arrangement 220 depicted, extends completely around the media pack 230, separating the media pack into an upstream section 230u and a downstream 230d. For a typical example, the seal arrangement 220 would comprise a single integral molded-in-place seal, typically a molded polymeric material such as a foamed polyurethane, made in a one-shot mold process and applied after the panels 215, 216 are in place on the media pack 230. The seal arrangement 220 is provided with an outer flange 240 which, when cartridge 201 is positioned within housing 50a, FIG. 19, is compressed between flanges 55, 56 to form a seal. Such a compression seal is generally referred to herein as a "axial" seal, or by similar terminology, since the force of compression on the seal member 220 is generally parallel to an access of air flow direction through the media pack 201.

The example housing seal arrangements described herein have no rigid structural member embedded therein, and each is molded from a single polymeric material, such as polyurethane. Thus, the housing seal arrangement 220 can be described as consisting essentially of molded polyurethane, typically foamed polyurethane.

Figure 21:
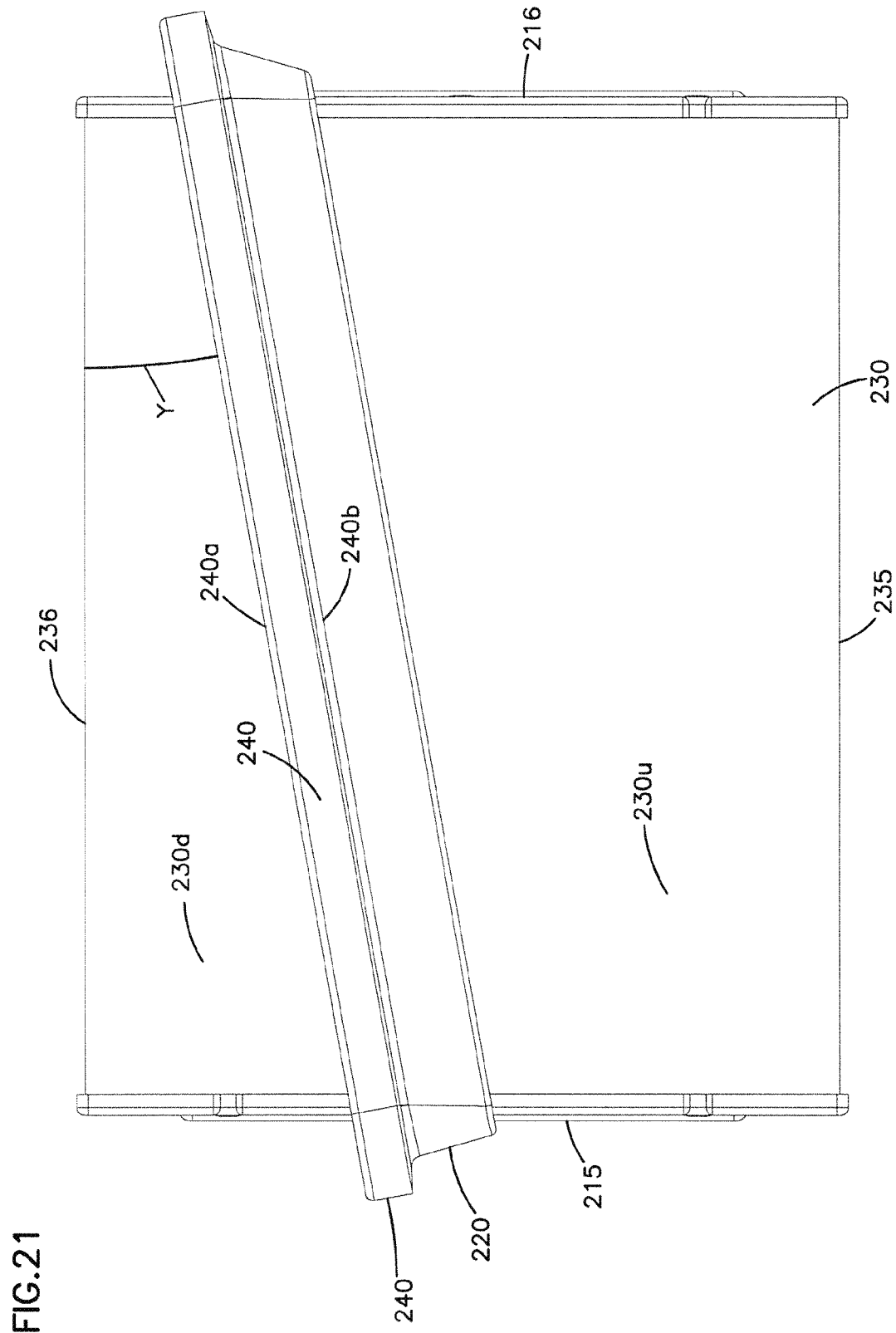
FIG. 21 is a side elevational view of the filter cartridge of FIG. 20.

Referring to FIG. 21, seal flange 240 generally extends at an angle Y relative to the outlet face 236 as previously discussed, i.e., typically at least 5° and usually within the range of 8° to 45°, inclusive, for example 8°-20°, inclusive. For the particular example shown the range would typically be 8°-15°, for example about 10°. More generally stated, the angle Y is greater than 0°, and usually not greater than 45°.

Figure 22:
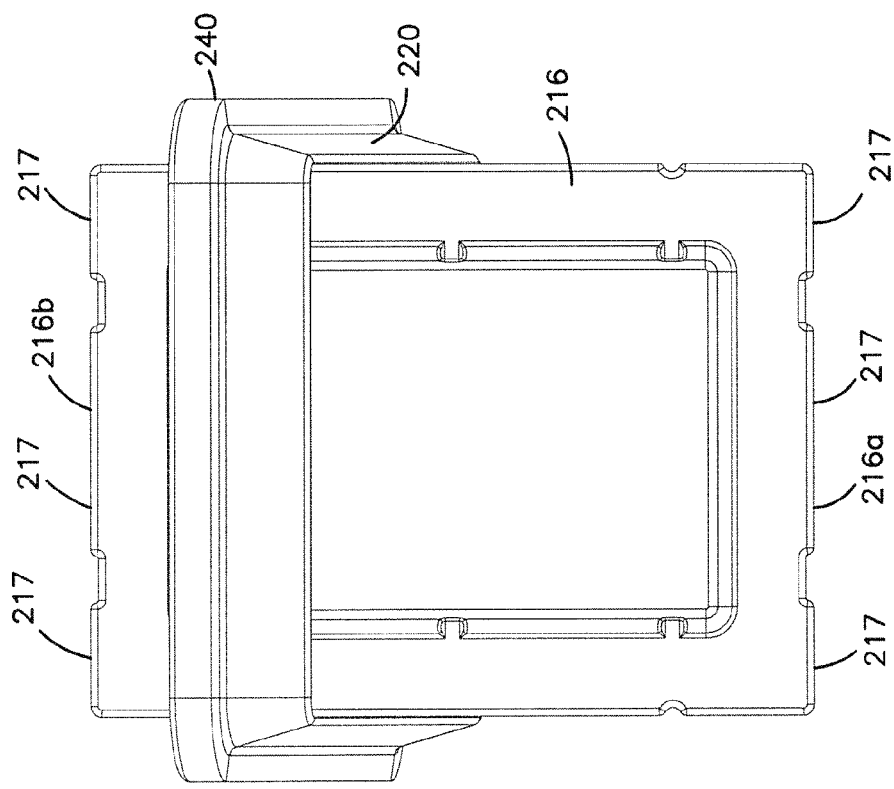
FIG. 22 is a first end elevational view of the cartridge of FIG. 20.
Figure 23:
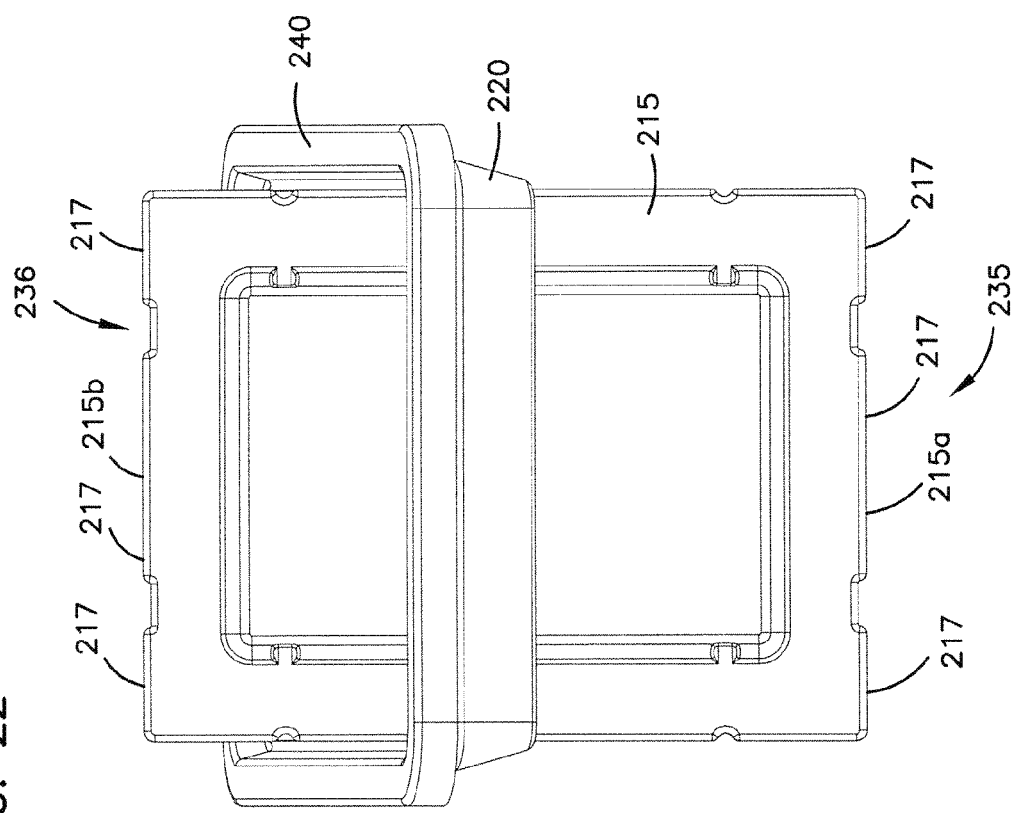
FIG. 23 is a second, opposite, end view if the filter cartridge of FIG. 20.

Referring to FIGS. 22 and 23, the configuration of the panels 215, 216 is shown. In particular each panel 215 includes opposite edges 215a, 215b, edge 215a being adjacent inlet face 235 and edge 215b being adjacent outlet face 236. Edges 215a and 215b are provided with projection regions 217 which extend beyond an adjacent face of the media pack. These regions 217 will engage the housing as shown in FIG. 19, for secure positioning of the cartridge, during installation. In particular regions 217 along edge 215a, will engage ledge 211, FIG. 19. Regions 217 along edge 215b will engage cover ledge 250, FIGS. 19, to help secure the cartridge against unintended motion. Ledge 215 is opposite ledge 211, and panel 215 is secured therebetween.

Referring to FIG. 23, panel 216 analogously includes opposite edges 216a and 216b, with projections 217. The projections 217 along edge 216a will be engaged by ledge 212 of FIG. 19, during installation. Projections 217 along edge 216b can be made to not engage structure within the housing, although if desired a ledge structure can be provided adjacent opposite corners, to help secure the cartridge 201 in position.

In FIG. 19, seal arrangement 220 can be seen in cross-section. The seal arrangement 220 includes a base 260, by which the media pack 201 and panels 215, 216 are engaged. Flange 240, which is compressed to form the seal, is secured to base 260. Typically the flange 240 is molded at end base 260, meaning the two are jointly molded from a single material, at the same time.

A trough 261 is provided between the flange 240 and the media pack 201 and panels 215, 216. The trough 261 generally extends toward base 260 and is surrounded by at least a portion of the flange 240. The trough 260 is positioned to receive a flange projection 270 therein, during installation, FIG. 19. The flange projection 270 is secured on one of the housing sections 51, 52, in this example the downstream housing section 52.

The trough 261 is generally configured to have a maximum depth of at least 3 mm, usually at least 4 mm and typically at least 5 mm. Examples would be 5-14 mm, although alternatives are possible.

Still referring to FIG. 19, flange 55 is configured to receive therein seal arrangement 220 during installation. Flange 55 includes an outer projection 275 which will surround flange 240, during installation. Flange 275 is of a sufficient length to bottom out against a portion of cover section 52, during installation.

Still referring to FIG. 19, cover section 52 includes flange arrangement 56 including inner projection 270 and outer projection 278. The inner projection 270, again, is sized to extend into trough 261. The outer projection 278 is sized to extend around projection 275, during installation. Flange 279 extending between projections 270, 278, provides a surface against which flange 275 can bottom out, during installation.

It is noted that radially outwardly projecting flange 279 includes projection 280 thereon, sized to press into axial seal flange 240, to help ensure seal. Such a projection will generally extend into the flange 240 a distance corresponding to at least 2% of the compressed thickness of the flange 240 between opposite walls 240a, 240b, FIG. 21.

Referring to FIG. 19, angle X indicates the angle between the outlet flow face 236 and the outlet tube 70. The angle is typically at least 10°, usually at least 15° and often within the range of 15° to 80°, inclusive, for example 15°-45°. As a result of angle X, outlet face 236 can be viewed as tipped toward outlet tube 70, with an apex of the media pack indicated at 300 corresponding to a portion of the media pack 201 highest within housing 50a, and positioned to tip face 236 toward outlet tube 70.

For the example of FIGS. 14-23, some example dimensions are provided, as follows: AA=217.1 mm; AB=328.0 mm; AC=301.5 mm; AD=500.9 mm; AE=328.4 mm; AF=112.1 mm.

An example material useable for both the seal and the side moldings described herein is polyurethane. An example polyurethane characterized is a foamed polyurethane which will increase in volume during use. Preferred ones increase by at least 40% in volume, to fill the mold cavities (typically at least 80% in volume) and having an as-molded density of no greater than 30 lbs/cu.ft (0.48 g/cc), typically no greater than 22 lbs/cu.ft. (0.35 g/cc) and usually with in the range of 10 lbs/cu.ft (0.16 g/cc) to 22 lbs/cu.ft (0.35 g/cc); and, a hardness (Shore A) typically of not greater than 30, preferably not greater than 25 and typically within the range of 10 to 22. Of course polyurethanes outside of this range can be used, but the characterized ones are advantageous for manufacturing and handling.

What is claimed is:

1. An air filter cartridge comprising:
   (a) a filter media pack comprising filter media and having an air inlet flow face and an air outlet flow face opposite the air inlet flow face, and a central flow axis through the air inlet flow face and the air outlet flow face;
      (i) the filter media pack having a rectangular cross-sectional shape in a direction perpendicular to the central flow axis; and
      (ii) the filter media pack comprising four sides, including a first pair of first and second opposite sides and a second pair of first and second opposite sides, extending between the air inlet flow face and the air outlet flow face;
   (b) first and second side pieces positioned on the first pair of first and second opposite sides of the filter media pack, respectively, wherein:
      (i) the first and second side pieces being configured to seal the first pair of first and second opposite sides of the filter media pack against air flow through the first pair of first and second opposite sides of the filter media pack; and
   (c) a housing seal arrangement for sealing the air filter cartridge to an air cleaner housing, in use, wherein:
      (i) the housing seal arrangement comprises a seal member that forms a pinch seal between housing pieces, in use;
      (ii) the seal member extends across the second pair of first and second opposite sides of the media pack so that the seal member extending across the second pair of first and second opposite sides of the media pack is arranged in a plane that is non-parallel to a plane perpendicular to the central flow axis; and
      (iii) the pinch seal, along a complete extension around the media pack, is spaced, along the central flow axis, from each of the first flow face and the second flow face.

2. An air filter cartridge according to claim 1 wherein:
   (a) the filter media pack comprises alternating fluted media and facing media.

3. An air filter cartridge according to claim 2 wherein:
   (a) the alternating fluted media and facing media are secured to each other at one end of the first flow face and the second flow faces.

4. An air filter cartridge according to claim 2 wherein:
   (a) the alternating fluted media and facing media comprises a stack of alternating strips of a fluted media sheet secured to a facing media sheet.

5. An air filter cartridge according to claim 1 wherein:
   (a) the housing seal arrangement further comprises a receiving trough positioned inwardly from the seal member that forms a pinch seal.

6. An air filter cartridge according to claim 1 wherein:
   (a) the first and second side pieces each comprise a surface spaced from the air outlet flow face of the filter media pack in a direction away from the air inlet flow face of the filter media pack.

7. An air filter cartridge according to claim 6 wherein:
   (a) the surfaces of the first and second side pieces include portions located beyond the air outlet flow face of the filter media pack are constructed to not engage an air cleaner housing, in use.

8. An air filter cartridge according to claim 1 wherein:
   (a) the seal member extends across the first pair of first and second sides of the filter media pack and across the second pair of the first and second sides of the filter media pack.

9. An air filter cartridge according to claim 6 wherein:
   (a) the surfaces of the first and second side pieces located beyond the outlet flow face of the filter media pack comprise a plurality of bumps.

10. An air filter cartridge according to claim 6 wherein:
    (a) the surfaces of the first and second side pieces located beyond the outlet flow face of the filter media pack comprise a plurality of recesses.

11. An air filter cartridge according to claim 1 wherein:
    (a) the first and second side pieces are molded in place on the first pair of first and second opposite sides of the filter media pack.

12. An air filter cartridge according to claim 1 wherein:
    (a) the first and second side pieces comprise preforms attached to the media pack by a potting material.

13. An air filter cartridge according to claim 6 wherein:
    (a) the surfaces of the first and second side pieces spaced from the air outlet flow face of the filter media pack are spaced at least 0.5 mm from the air outlet flow face of the filter media pack.

14. An air filter cartridge according to claim 6 wherein:
    (a) the surfaces of the first and second side pieces spaced from the air outlet flow face of the filter media pack are spaced at least 1 mm from the air outlet flow face of the filter media pack.

15. An air filter cartridge according to claim 6 wherein:
    (a) the surfaces of the first and second side pieces spaced from the air outlet flow face of the filter media pack are spaced 1.5 mm to 3.5 mm from the air outlet flow face of the filter media pack.

16. An air filter cartridge according to claim 1 wherein:
    (a) a portion of the seal member extends parallel to the air inlet flow face of the filter media pack.

17. An air filter cartridge according to claim 1 wherein:
    (a) a portion of the seal member extends at an angle of greater than 0 degrees to a plane perpendicular to the central flow axis.

18. An air filter cartridge according to claim 1 wherein:
    (a) the seal member extends at an angle of at least 5 degrees to 45 degrees to a plane perpendicular to the central flow axis.

19. An air filter cartridge according to claim 1 further comprising:
    (a) a protective material located over the second pair of first and second sides of the filter media pack.

20. An air filter cartridge according to claim 19 wherein:
    (a) the protective material is secured in place against the filter media pack by molding the first and second side pieces to the first pair of opposite sides of the filter media pack.

21. An air filter cartridge according to claim 19 wherein:
    (a) the protective material comprises cardboard or plastic.

22. An air filter cartridge according to claim 1 wherein:
    (a) at least 30% of the second pair of first and second opposite sides of the filter media pack is uncovered.

23. An air filter cartridge according to claim 1 wherein:
    (a) at least 40% of the second pair of first and second opposite sides of the filter media pack is uncovered.

24. An air filter cartridge according to claim 1 wherein:
(a) the first and second side pieces have an as-molded density of no greater than about 30 lbs/ft$^3$.

25. An air filter cartridge according to claim 1 wherein:
(a) the first and second side pieces have a hardness, Shore A, of no greater than about 30.

26. An air filter cartridge according to claim 1 wherein:
(a) the first pair of first and second opposite sides being longer than the second pair of first and second opposite sides.

27. An air filter cartridge comprising:
(a) a filter media pack comprising filter media and having an air inlet flow face and an air outlet flow face opposite the air inlet flow face, and a central flow axis through the air inlet flow face and the air outlet flow face;
  (i) the filter media pack having a rectangular cross-sectional shape in a direction perpendicular to the central flow axis; and
  (ii) the filter media pack comprising four sides, including a first pair of first and second opposite sides and a second pair of first and second opposite sides, extending between the air inlet flow face and the air outlet flow face;
(b) first and second side pieces positioned on the first pair of first and second opposite sides of the filter media pack, respectively, wherein:
  (i) the first and second side pieces being configured to seal the first pair of first and second opposite sides of the filter media pack against air flow through the first pair of first and second opposite sides of the filter media pack; and
  (ii) the first and second side pieces each comprise a surface spaced from the air outlet flow face of the filter media pack in a direction away from the air inlet flow face of the filter media pack; and
(c) a housing seal arrangement for sealing the air filter cartridge to an air cleaner housing, in use, wherein:
  (i) the housing seal arrangement comprises a seal member that forms a pinch seal between housing pieces, in use;
  (ii) the seal member extends across the filter media pack first pair of first and second opposite sides and across the filter media pack second pair of first and second sides; and
  (ii) the seal member that extends across the second pair of first and second opposite sides of the media pack is arranged in a plane that is non-parallel to a plane perpendicular to the central flow axis.

28. An air filter cartridge according to claim 27 wherein:
(a) the filter media pack comprises alternating fluted media and facing media.

29. An air filter cartridge according to claim 27 wherein:
(a) the alternating fluted media and facing media are secured to each other at one end of the first flow face and the second flow faces.

30. An air filter cartridge according to claim 27 wherein:
(a) the alternating fluted media and facing media comprises a stack of alternating strips of a fluted media sheet secured to a facing media sheet.

31. An air filter cartridge according to claim 27 wherein:
(a) the housing seal arrangement further comprises a receiving trough positioned inwardly from the seal member that forms a pinch seal.

32. An air filter cartridge according to claim 27 wherein:
(a) the surfaces of the first and second side pieces include portions located beyond the air outlet flow face of the filter media pack are constructed to not engage an air cleaner housing, in use.

33. An air filter cartridge according to claim 27 wherein:
(a) the first pair of first and second opposite sides being longer than the second pair of first and second opposite sides.

34. An air filter cartridge according to claim 27 wherein:
(a) the pinch seal, along the complete extension around the media pack, is spaced, along the central flow axis, from each of the first flow face and the second flow face.

* * * * *